(12) United States Patent
Doherty et al.

(10) Patent No.: US 9,630,590 B2
(45) Date of Patent: Apr. 25, 2017

(54) CONTROL METHOD, DEVICE AND SYSTEM FOR A VEHICLE

(71) Applicant: TRACKNSTOP LIMITED, Donnybrook, Dublin (IE)

(72) Inventors: Michael Doherty, Dublin (IE); Stephen Kehoe, Bray (IE); Tristan Fagan-Guimond, Dublin (IE)

(73) Assignee: TRACKNSTOP LIMITED, Donnybrook, Dublin (IE)

( * ) Notice: Subject to any disclaimer, the term of this patent is extended or adjusted under 35 U.S.C. 154(b) by 0 days.

(21) Appl. No.: 14/656,951

(22) Filed: Mar. 13, 2015

(65) Prior Publication Data

US 2015/0258961 A1 Sep. 17, 2015

Related U.S. Application Data

(63) Continuation-in-part of application No. 14/270,832, filed on May 6, 2014, now abandoned.

(30) Foreign Application Priority Data

Mar. 13, 2014 (EP) .................................... 14159612
May 6, 2014 (EP) .................................... 14167253
May 6, 2014 (IE) .................................. S2014/0116

(51) Int. Cl.
*B60R 25/042* (2013.01)
*B60R 25/10* (2013.01)
(Continued)

(52) U.S. Cl.
CPC ........ *B60R 25/042* (2013.01); *B60R 25/1012* (2013.01); *B60R 25/305* (2013.01);
(Continued)

(58) Field of Classification Search
CPC .... B60R 25/042; B60R 25/1012; B60R 25/33
(Continued)

(56) References Cited

U.S. PATENT DOCUMENTS 6,392,531 B1   5/2002 Gabbard
7,323,970 B1   1/2008 Murray et al.
(Continued)

FOREIGN PATENT DOCUMENTS

GB    2340974 A    3/2000
GB    2439137 A    12/2007
(Continued)

*Primary Examiner* — Yazan Soofi
(74) *Attorney, Agent, or Firm* — Hoffmann & Baron, LLP

(57) ABSTRACT

The present invention relates to a method, device and system for controlling a powered vehicle. The device comprises a communications unit operable to receive a vehicle control signal from a remote computer, and a control unit operable to activate and deactivate the fuel pump such that movement of the vehicle is controlled in response to the vehicle control signal received by the communications unit so that the vehicle may be gradually stopped by incrementally cutting fuel to the vehicles pump in a safe manner. Additionally, the present invention provides a remote control disable function by cutting power to vehicle ignition. The present invention further provides a vehicle tracking functionality.

15 Claims, 36 Drawing Sheets

(51) Int. Cl.
*B60R 25/33* (2013.01)
*B60R 25/30* (2013.01)
*B60R 25/04* (2013.01)

(52) U.S. Cl.
CPC ...... *B60R 25/33* (2013.01); *B60R 2025/0405* (2013.01); *B60R 2025/0415* (2013.01)

(58) Field of Classification Search
USPC .......................................................... 701/2
See application file for complete search history.

(56) References Cited

U.S. PATENT DOCUMENTS

| | | | |
|---|---|---|---|
| 7,548,803 B2 | 6/2009 | MacCarthy | |
| 2003/0016130 A1* | 1/2003 | Joao | B60R 25/102 340/539.1 |
| 2003/0067541 A1 | 4/2003 | Joao | |
| 2004/0053603 A1* | 3/2004 | Langstrom | G08B 21/028 455/414.1 |
| 2005/0248444 A1* | 11/2005 | Joao | B60R 25/042 340/426.13 |
| 2011/0140871 A1* | 6/2011 | Christensen | B60R 25/04 340/426.11 |
| 2011/0148713 A1 | 6/2011 | D'Avello | |
| 2012/0268267 A1 | 10/2012 | Anderson | |
| 2013/0204462 A1* | 8/2013 | Trujillo | G06F 17/00 701/2 |

FOREIGN PATENT DOCUMENTS

| | | |
|---|---|---|
| GB | 2473138 A | 3/2011 |
| WO | 9933686 | 7/1999 |
| WO | 2008018088 A1 | 2/2008 |

\* cited by examiner

CONTROL METHOD, DEVICE AND SYSTEM FOR A VEHICLE

CROSS-REFERENCE TO RELATED APPLICATIONS AND CLAIM OF PRIORITY

This application is a Continuation-In-Part of U.S. patent application Ser. No. 14/270,832 filed the 6 May 2014; this Application is also based on, and, to the extent each reference qualifies, Applicants claim priority from, European Patent Application Number 14159612.2 filed 13 Mar. 2014, European Patent Application Number 14167253.5 filed the 6 May 2014, fish Short-Term Patent Application No. S2014/0116 filed 6 May 2014, and PCT/EP2015/055243 filed 12 Mar. 2015, all of which are incorporated herein by reference.

The present invention relates to a control method and device for a vehicle, and more particularly, a powered vehicle such as a motor car, bus, van, truck or boat. The invention further relates to a vehicular control system.

The theft of vehicles remains a serious problem despite advances in immobilisation technologies, and it typically falls to law enforcement agencies, such as the police, to locate a stolen vehicle and potentially apprehend those responsible for the theft. In some circumstances law enforcement agency personnel may also find themselves in pursuit of a moving stolen vehicle, which is an extremely dangerous situation and often places the lives of many people and also property at risk.

It is an object of the present invention to provide a method and device for controlling a vehicle and a vehicular control system which goes at least some way toward overcoming the above problems and/or which will provide the public and/or industry with a useful alternative.

Further aspects of the present invention will become apparent form the ensuing description which is given by way of example only.

According to the invention, there is provided a control device for a powered vehicle comprising:
- a communications unit operable to receive a vehicle control signal from a remote computer, and
- a control unit operable to activate and deactivate a fuel pump of the vehicle such that movement of the vehicle is controlled in response to the vehicle control signal received by the communications unit.

Preferably, the control unit is coupled to the communications unit and the fuel pump of the vehicle.

The present invention provides a control device for a powered vehicle whereby a vehicle owner and/or law enforcement agencies may remotely control a vehicle by gradually cutting fuel to the vehicles fuel injection system by controlling the fuel pump. The advantage of this is that in conjunction with authorities and monitoring stations the present invention is operable to control a vehicle, which includes slowing and/or bringing a moving vehicle to a gradual or incremental stop, and preventing a vehicle from starting, as well as providing further features for anti-theft and recovery.

In another embodiment of the invention, the control unit comprises fuel pump switching means operable to control the supply of power to the fuel pump such that the fuel pump is activated and deactivated.

In another embodiment of the invention, the fuel pump switching means comprises a fuel pump relay installed intermediate the fuel pump and a main electrical power supply means of the vehicle.

In another embodiment of the invention, the fuel pump switching means is connected in-line with electrical power supply lines from the fuel pump to the main electrical power supply means of the vehicle.

The fuel pump switching means of the control unit of present invention is installed such that is does not effect the operation of the vehicles main fuse board and so does not avoid or circumvent any manufactured vehicle controls or safety systems.

In another embodiment of the invention, the control unit is operable to activate and deactivate the fuel pump at timed intervals.

Such a feature ensures that a vehicle may be safely and gradually brought to a stop, even whilst travelling at speed.

In another embodiment, the control unit further comprises fuel level indicator setting means operable in response to the vehicle control signal to set a fuel level indicator gauge of the vehicle. In response to the vehicle control signal received by the communications unit, the fuel gauge of the vehicle may thus show as empty to provide an indication that vehicle has run out of fuel, even when there may be fuel in the fuel tank, when the movement of vehicle is controlled according to the vehicle control signal.

In another embodiment of the invention, the control device is connected to the vehicle intermediate a main fuse board/main power supply of the vehicle and the fuel pump.

Installing the device in this arrangement ensures that the vehicles manufactured controls or safety systems are not avoided or circumvented.

In another embodiment of the invention, the control unit is further coupled to an ignition system of the vehicle and comprises an ignition system switching means operable to control the supply of power to the ignition system to activate and deactivate the ignition system such that the vehicle is immobilised and mobilised in response to a vehicle control signal from the remote computer.

The advantage of such a feature includes that a vehicle may not be started until the ignition is re-enabled even if a vehicles keys are stolen. Such a feature includes that both the ignition immobilisation and re-enablement of the ignition system may be completed with the use of any computer and/or application enabled device operated by an authorised user, such as the vehicle owner.

Preferably, the ignition system switching means is connected in-line with electrical power supply lines from the ignition system to the main electrical power supply means of the vehicle.

The ignition system switching means of the control unit of present invention is installed such that is does not effect the operation of the vehicles main fuse board and so does not avoid or circumvent any manufactured vehicle controls or safety systems.

In another embodiment of the invention, the vehicle control signal from the remote computer is transmitted as an unstructured supplementary service data (USSD) signal, GPRS signal and/or a text message.

The advantage of such a feature, which comprises as an option the integration of USSD as a method of transferring data, is the provision of a global tracking solution with increased accuracy and reduced latency which is not dependent on availability of GPRS, which provides lower latency data transfer over a mobile network.

The present invention is designed to utilise USSD as a means of transferring data as well as GPRS and SMS.

A USSD programmed global SIM card is used within the device which is programmed with firmware to enable the devices modem to communicate over USSD via a USSD gateway. USSD allows a very fast method of passing data between a remote tracking device and the remote server without the requirement for a GPRS data connection. USSD opens a channel for "Instant" data connection between the device and the remote server computer regardless of location. The standard method of sending data over a mobile network carrier is not used. This results in very low latency/delay in global mapping. Unlike SMS and GPRS, USSD messaging creates a real-time connection during a session. This session remains open, allowing a two-way exchange of a sequence of data. Unlike a normal mobile data connection which traditional tracking systems require, USSD does not need to set-up a GPRS, 3G or 4G connection. All that is required is a mobile signal and that the device is registered on a mobile network, then it is ready to send and receive data.

USSD messages are sent from the SIM & device modem and arrive at the URL for the remote server as content type text/xml. USSD messaging transmits remote sensor data over GSM networks. USSD is integral on GSM networks so is available throughout the world, even where mobile data network access is not available, such as where a mobile or smart phone has no 4G, 3G, 2G or GPRS signal but it has even limited signal reception for a voice call. Using USSD means there is no delay in sending data over a mobile network as the data is sent directly to remote server. Two-way communications is possible using the API (Application Programming Interface) implemented for the present invention to send and receive data from the control and immobilisation device.

In the present invention, SMS and GPRS may also be used for sending data. Re-encryption of data by the remote server allows for utilising this data to provide mapping to traditional GPRS platforms as well as communicating with clients via SMS. Between 3 to 6 or more "channels" can be opened and used concurrently using the SIM set-up for USSD communications.

In another embodiment of the invention, the control device further comprises vehicle position tracking means operable to capture location data, such as GPS data, for the vehicle and transmit the location data to a GPS server.

The use of vehicle position tracking means enables the exact location details of the vehicle to be gathered, with live mapping of a vehicle location being provided to one or more of the vehicle owner, authorities, and emergency services.

In another embodiment of the invention, the communications unit is operable to receive and to transmit to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

Images captured by an on-board vehicle camera enables the immediate ability for monitoring stations and authorities to obtain an image of the perpetrator within the vehicle for law enforcement agencies, including whether the perpetrator is alone and/or armed, and the physical characteristics of the perpetrator, such as size. Image and/or audio data may be transferred via GPRS.

Motion alerts provide an early warning alert to a vehicle owner and/or monitoring stations that a vehicle is being interfered with/and/or stolen.

Geo-fence alerts provide an early warning alert to a vehicle owner and/or monitoring stations informing if a vehicle enters an undesired area, such as a port for transfer of the vehicle overseas without permission, such as in the event of theft of the vehicle.

GSM jamming detection alerts provide the advantage that attempts made to disrupt or prevent the communication capabilities of the device may be identified to a vehicle owner and/or monitoring stations. In response to such GSM jamming detection alerts the device is operable will locally immobilise the vehicle without the requirement of a communications network. The device further comprises an enclosed back-up power supply in the event of vehicle power cut.

Control device reboot alerts ensure that any unauthorised attempt to tamper with the installed device triggers an alert, which is sent to the vehicle owner and/or monitoring stations.

The provision of ignition system activation and deactivation alerts, and fuel pump activation and deactivation alerts, provides confirmation to a vehicle owner and/or monitoring stations that the vehicle is either immobilised or enabled.

Panic button alerts provide the advantage that when a hijacking occurs or should the vehicle driver be in danger they may summon assistance by pressing a panic button, which may optionally be hidden from view within or outside the vehicle and when pressed triggers a signal transmission to a monitoring station. Panic buttons may be installed within a boot in high-risk situations.

Driver behaviour alerts enable the transmission of information relating to the way the vehicle is being driven, including over-speed and harsh driving, to be sent to vehicle owners, clients, authorities and/or insurance companies.

In another embodiment of the invention, the remote computer is one or more of a: remote control computer server, or a mobile computing device, such as a smart phone, laptop or personal computer.

The advantage of such a feature includes that the vehicle control signal may be transmitted to the vehicle from a variety of enabled devices or computers.

In another embodiment of the invention, the control device further comprises motion sensing means operable to sense movement of the vehicle and to transmit movement data to the remote computer.

The use of motion sensing means facilitates the detection of theft and enables early warning alerts to be sent to a client and/or monitoring station.

In another embodiment of the invention, the motion sensing means is adapted to detect an impacting force on the vehicle, in which detection of an impacting force triggers the transmission of an impact detection signal from the communications unit to the remote computer and automatically generates a channel for audio communication from audio input/output means of the vehicle to the remote computer. Such audio data may be transmitted via GPRS.

The present invention integrates motion sensing means to provide means for determining if the vehicle has had an accident by detecting a front, side or rear impact, and/or if the vehicle has turned over. Upon recognition that an accident has taken place the present invention further automatically places a two-way call from the vehicle to emergency services. The device will be able to provide impact information, such as G force data, resulting from the accident. To integrate such a feature an additional speaker and microphone is installed in the vehicle. The installed device within the vehicle is programmed to make an emergency call from within the vehicle using the pre-programmed SIM card. The device has an internal back-up battery in the event of vehicle power failure on impact. Location mapping services are also made immediately available to emergency services.

In a further aspect the present invention relates to a control system for at least one powered vehicle comprising: a remote control computer server connected by a computer network to a least one control device as described above, and at least one mobile computing device.

In a further aspect the present invention relates to a method of controlling a powered vehicle using a control device comprising one or more processors and a memory, the method comprising steps of:
receiving a vehicle control signal from a remote computer at a communications unit of the control device, and
activating and deactivating a fuel pump of the vehicle such that movement of the vehicle is controlled in response to the vehicle control signal received by the communications unit.

In another embodiment of the invention, the method comprises the step of: controlling the supply of power to a fuel pump of the vehicle to activate and deactivate the fuel pump such that the vehicle when moving is brought to a gradual stop or is prevented from starting if stationary.

In another embodiment of the invention, the method comprises the step of: activating and deactivating the fuel pump at timed intervals.

Preferably, the step of activating and deactivating the fuel pump at timed intervals comprises using a square wave digital signal.

In another embodiment of the invention, the method comprises the step of: setting a fuel level indicator gauge of the vehicle in response to the vehicle control signal such that the fuel level indicator gauge indicates that there is no fuel in a fuel tank of the vehicle when the movement of the vehicle is controlled in response to the vehicle control signal received by the communications unit.

In another embodiment of the invention, the method comprises the step of: controlling the supply of power to the ignition system to activate and deactivate the ignition system such that the vehicle is immobilised and mobilised in response to a vehicle control signal from the remote computer.

In another embodiment of the invention, the method comprises the step of: transmitting the vehicle control signal from the remote computer as one or more of: an unstructured supplementary service data (USSD) signal, a GPRS signal and a text message.

In another embodiment of the invention, the method comprises the step of: capturing location data, such as GPS data, for the vehicle and transmit the location data to a GPS server.

In another embodiment of the invention, the method comprises the step of: receiving and transmitting to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

In another embodiment of the invention, the method comprises the step of: sensing movement of the vehicle and transmitting motion data to the remote computer.

In another embodiment of the invention, the method comprises the step of: detecting an impacting force on the vehicle, in which detection of an impacting force triggers transmission of an impact detection signal from the communications unit to the remote computer and automatically generates a channel for audio communication from audio input/output means of the vehicle to the remote computer.

In another embodiment of the invention, the method comprises a step of: sending a confirmation signal to the remote computer via a gateway for updating a database and user interface with data concerning a fuel cut event. Such a gateway may optionally be a USSD gateway.

According to the invention, there is provided a control device for a powered vehicle comprising:
a communications unit operable to receive vehicle control signals from a remote computer,
a control unit coupled to the communications unit, to a fuel pump of the vehicle and to an ignition system of the vehicle, the control unit comprising: fuel pump switching means operable to activate and deactivate the fuel pump of the vehicle such that movement of the vehicle is controlled to incrementally slow the vehicle in response to a vehicle control signal received by the communications unit, and an ignition system switching means operable to control the supply of power to the ignition system to activate and deactivate the ignition system such that the vehicle is immobilised and mobilised in response to a vehicle control signal from the remote computer, and
vehicle position tracking means operable to capture real time location data for the vehicle and to transmit the location data to the remote computer to display a current location of the vehicle.

In another embodiment of the invention, vehicle control signals are transmitted as unstructured supplementary service data (USSD) signals.

In another embodiment of the invention, the communications unit is operable to receive and to transmit to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

In another embodiment of the invention, the data is transmitted as one or more of unstructured supplementary service data (USSD) messages, a GPRS signal and a text message.

In another embodiment of the invention, the remote computer is one or more of a: remote control computer server, or a mobile computing device, such as a smart phone, laptop or personal computer.

In another embodiment of the invention, further comprising motion sensing means operable to sense movement of the vehicle and to transmit motion data to the remote computer.

In another embodiment of the invention, the motion sensing means is adapted to detect an impacting force on the vehicle, in which detection of an impacting force triggers the transmission of an impact detection signal from the communications unit to the remote computer and automatically generates a channel for audio communication from audio input/output means of the vehicle to the remote computer.

According to the invention, there is provided a method of controlling a powered vehicle using a control device comprising one or more processors and a memory, the method comprising steps of:
receiving a vehicle control signal from a remote computer at a communications unit of the control device, and
activating and deactivating a fuel pump to control the supply of power to a fuel pump of the vehicle such that movement of the vehicle is controlled in response to the vehicle control signal received by the communications unit, controlling the supply of power to an ignition system of the vehicle to activate and deactivate the ignition system such that the vehicle is immobilised and mobilised in response to a vehicle control signal from the remote computer, and operating vehicle position tracking means to capture real time location data for the vehicle and to transmit the location data to the remote computer to display a current location of the vehicle.

In another embodiment of the invention, the method comprises a step of: transmitting the vehicle control signals from the remote computer as unstructured supplementary service data (USSD) signals.

In another embodiment of the invention, the method comprises a step of: receiving and transmitting to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

In another embodiment of the invention, the method comprises a step of: transmitting the data as one or more of unstructured supplementary service data (USSD) messages, GPRS signals and text messages.

In another embodiment of the invention, the method comprises a step of: sensing movement of the vehicle and transmitting motion data to the remote computer.

In another embodiment of the invention, the method comprises a step of: detecting an impacting force on the vehicle, in which detection of an impacting force triggers transmission of an impact detection signal from the communications unit to the remote computer and automatically generates a channel for audio communication from audio input/output means of the vehicle to the remote computer.

The invention will be more clearly understood from the following description of some embodiments thereof, given by way of example only, with reference to the accompanying drawings, in which.

Figure 10:
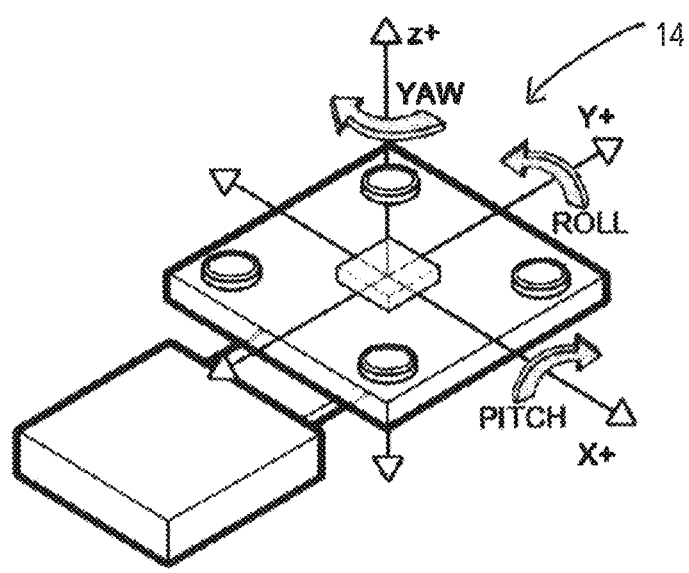
Figure 24:
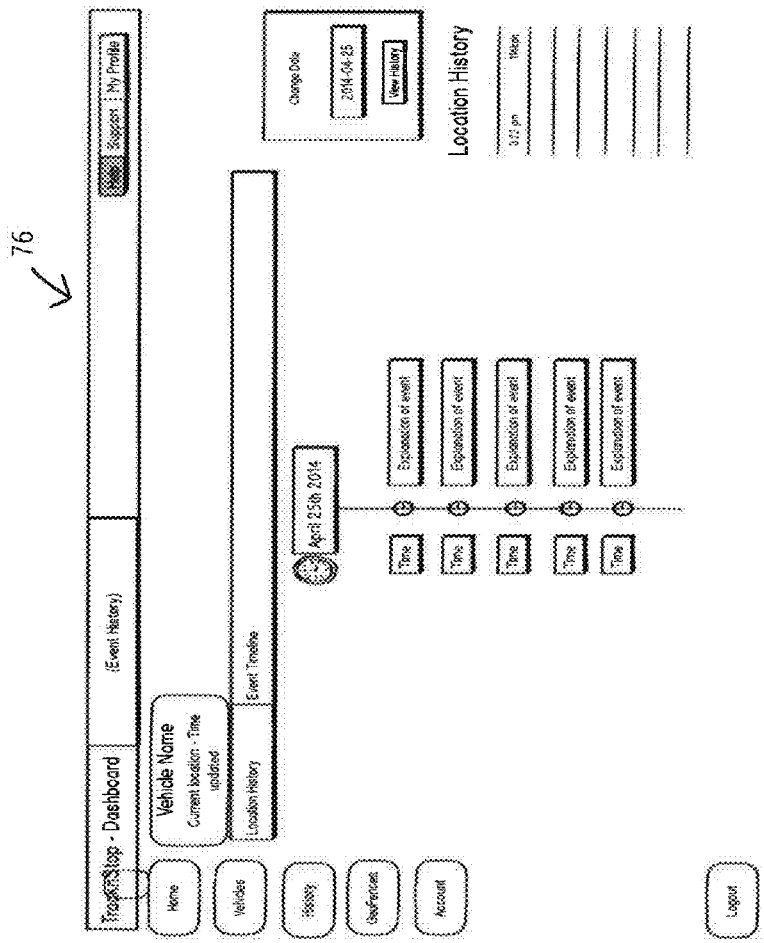
Figure 25:
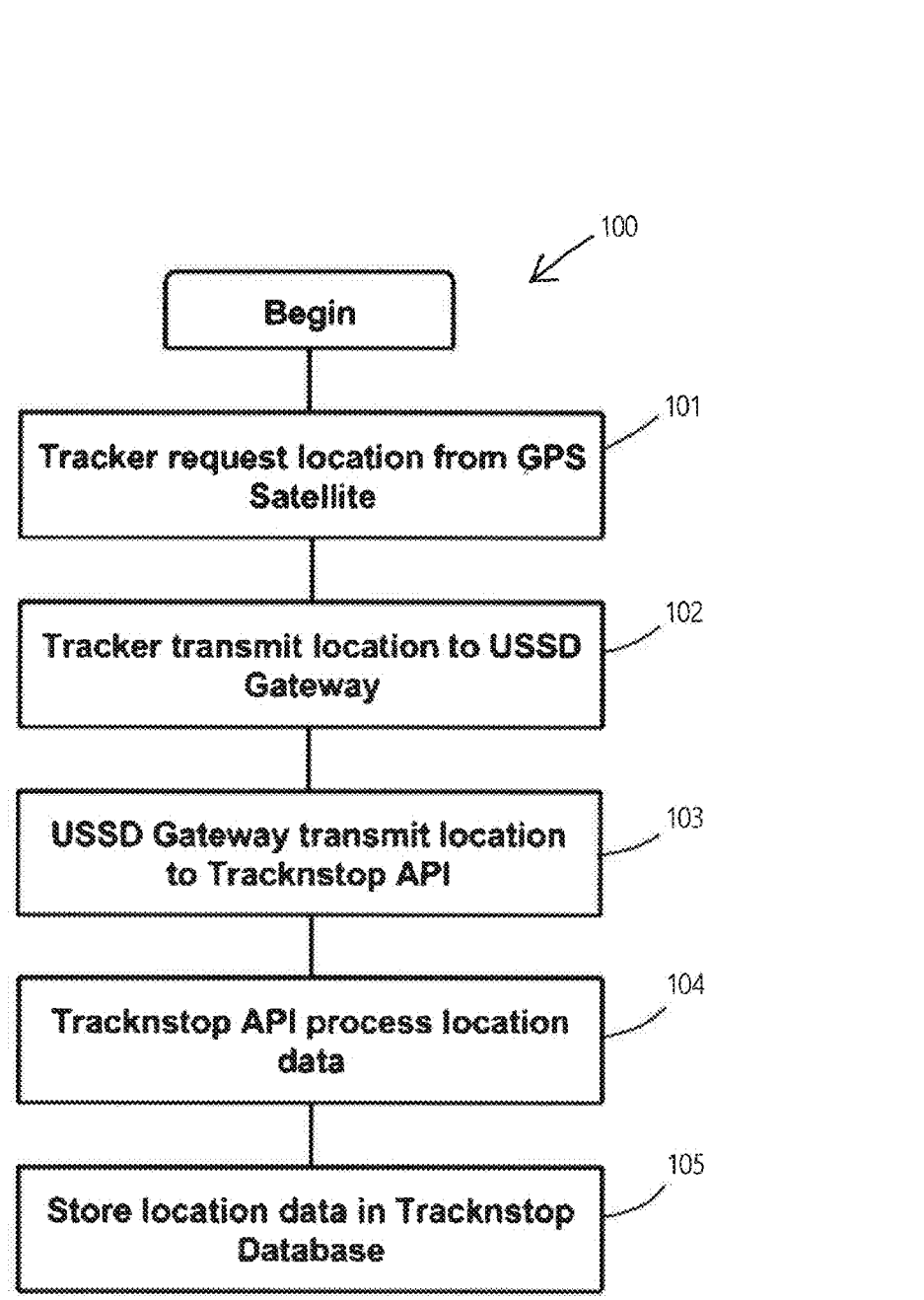
Figure 26:
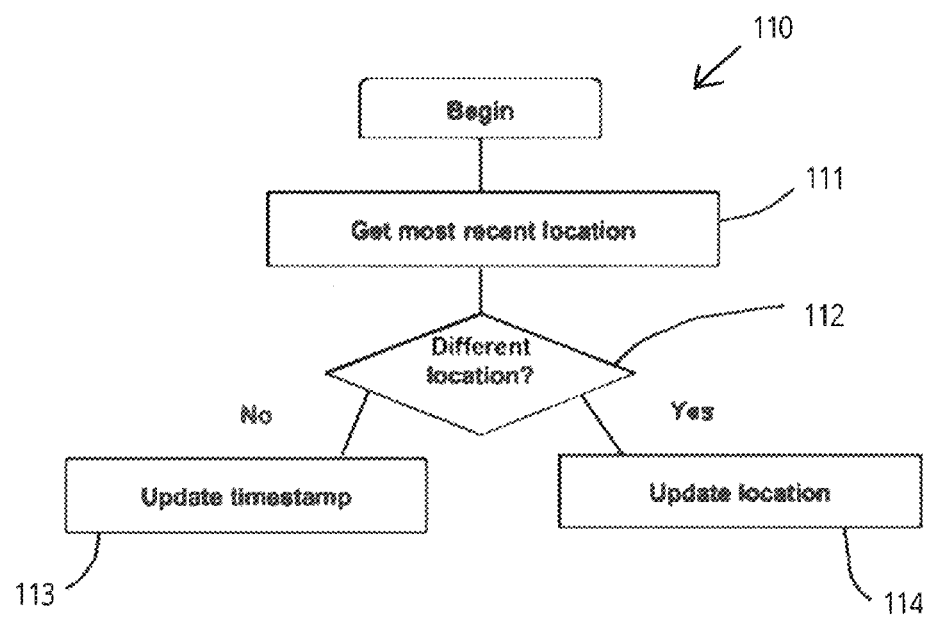
Figure 27:
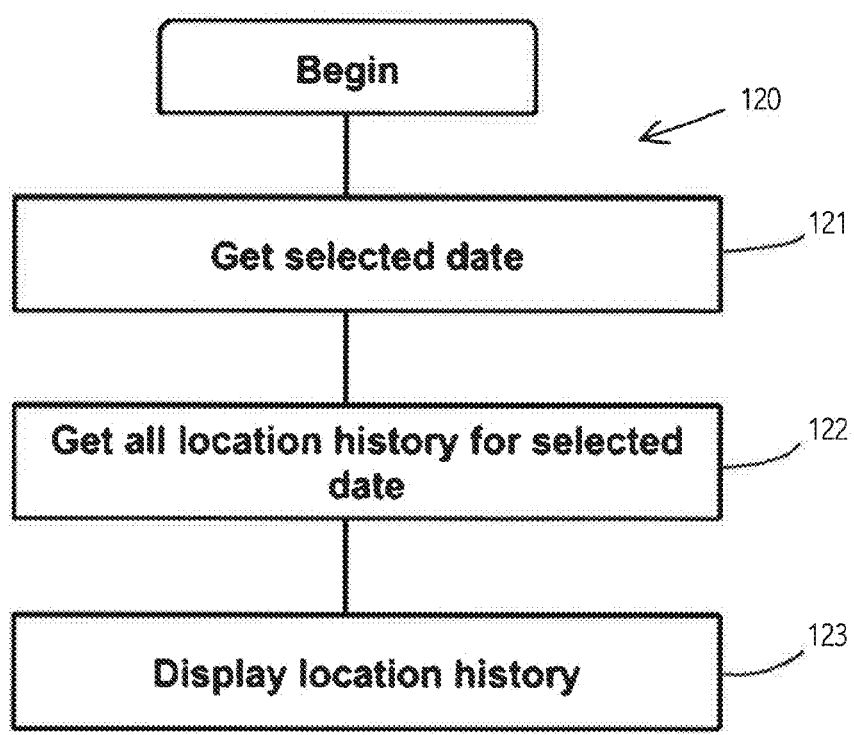
Figure 28:
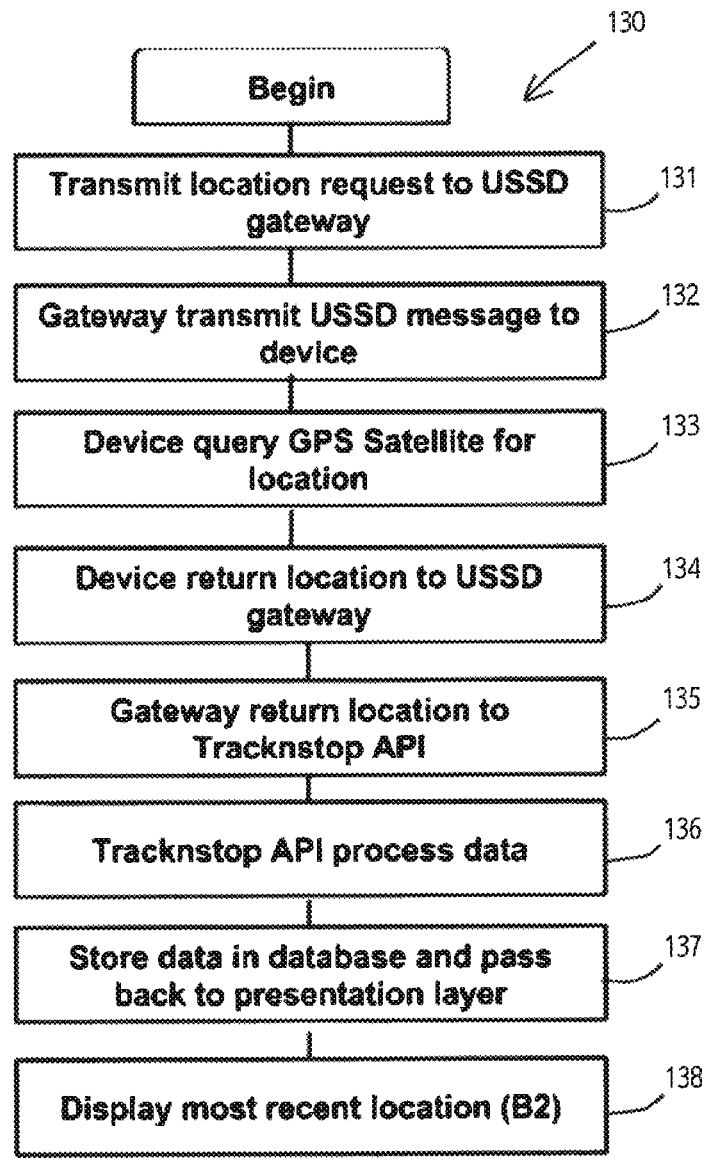
Figure 29:
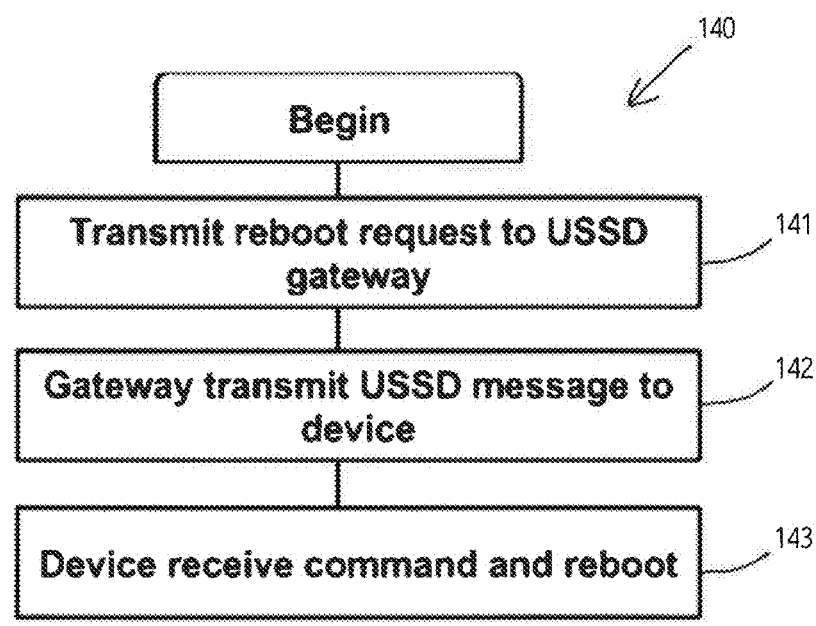
Figure 30:
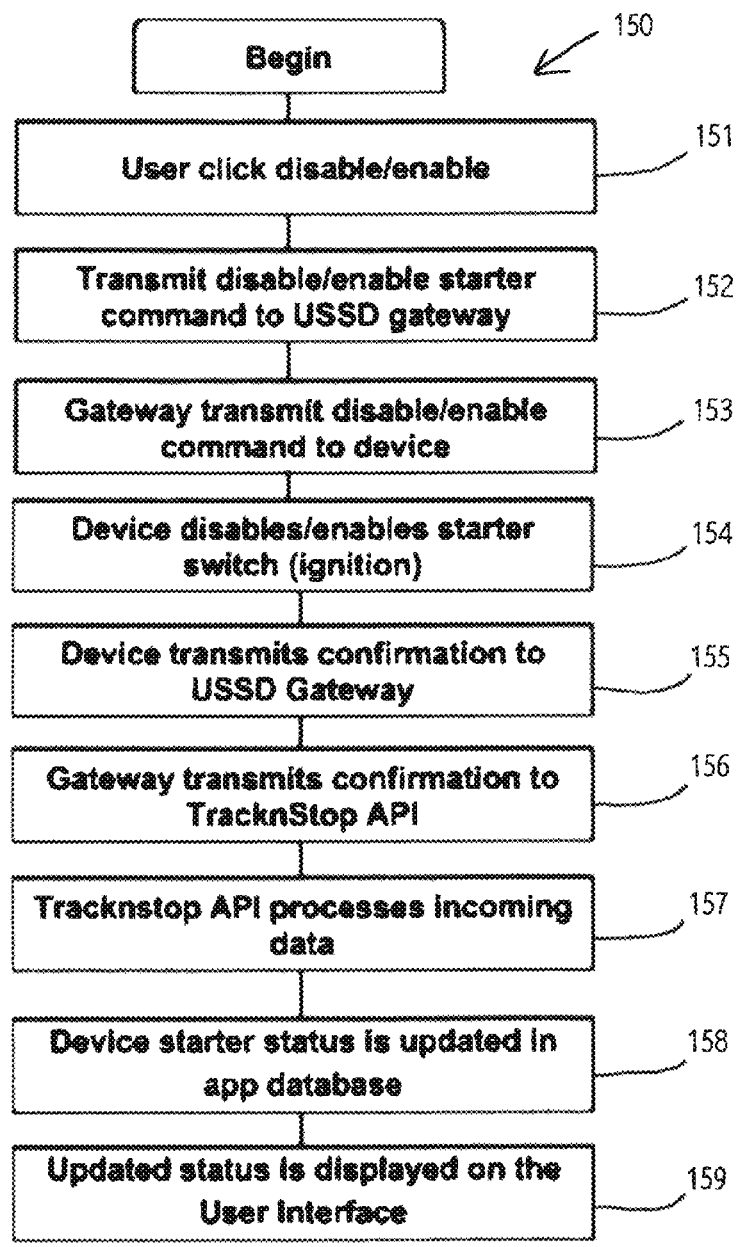
Figure 31:
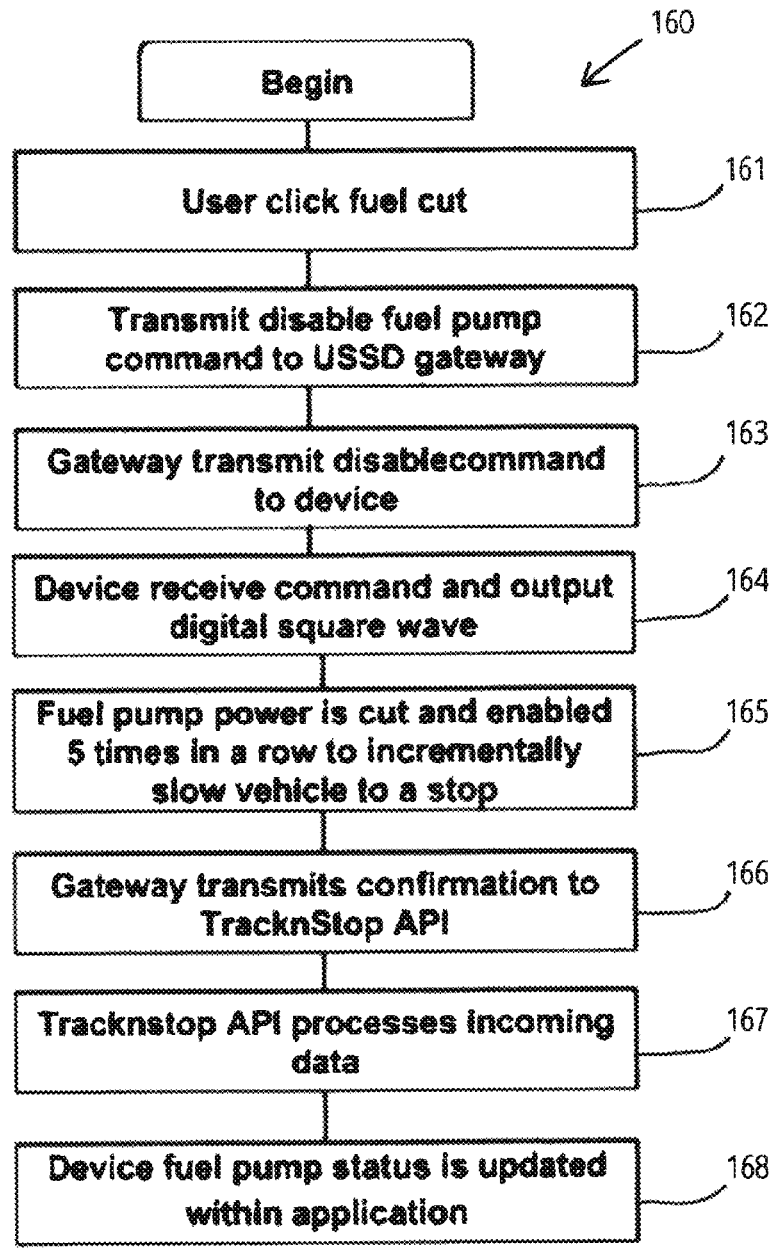
Figure 32:
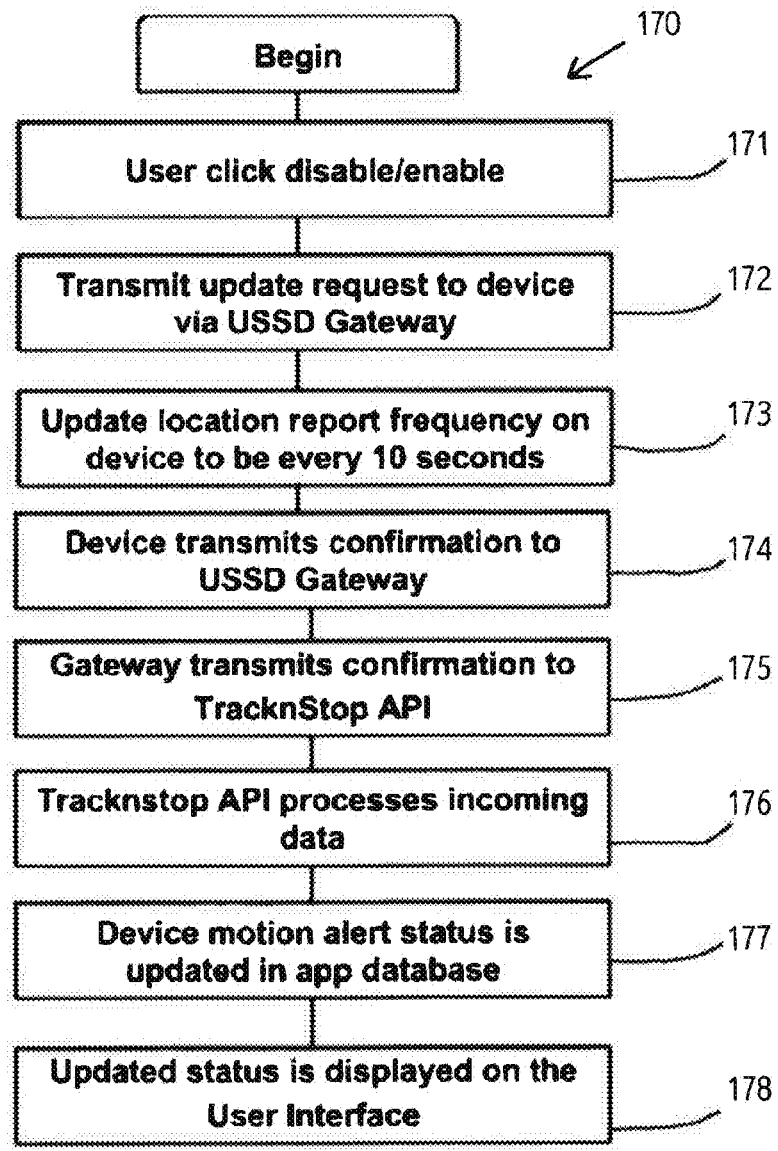
Figure 33:
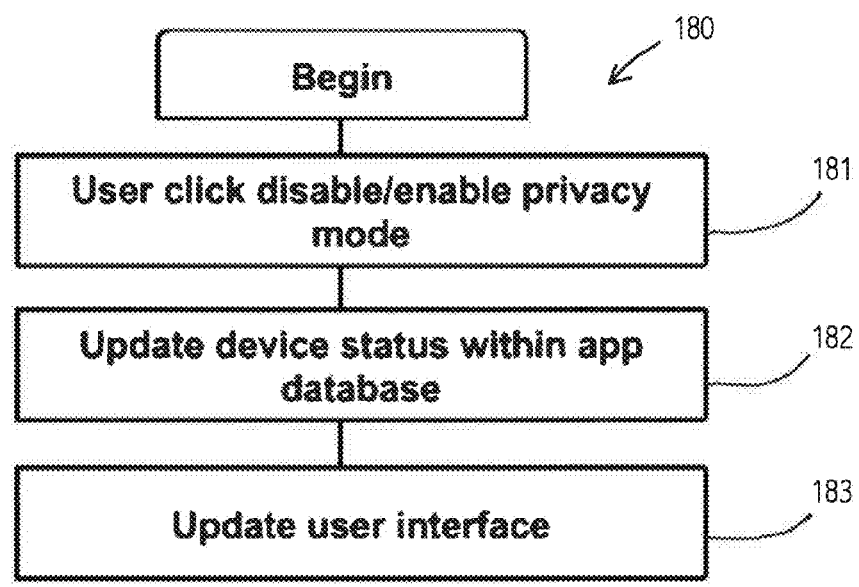
Figure 34:
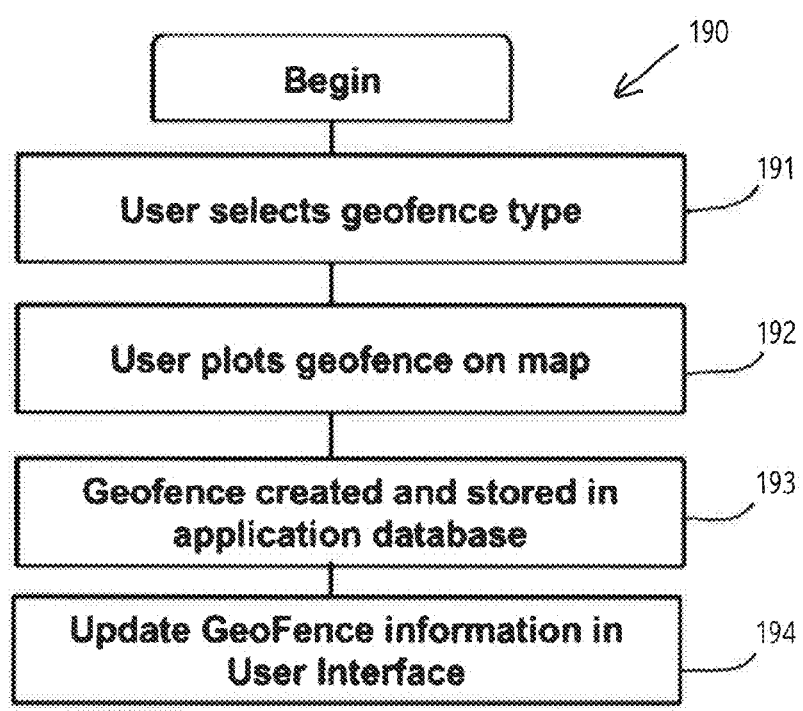
Figure 35:
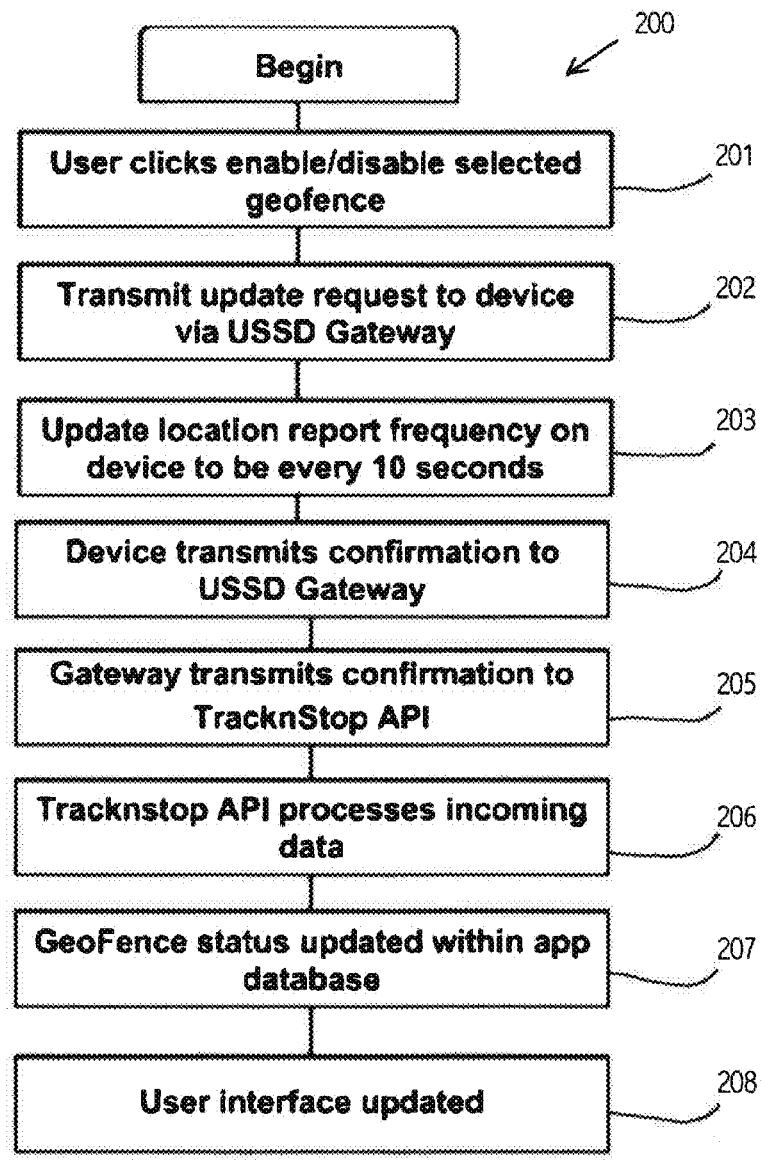
Figure 36:
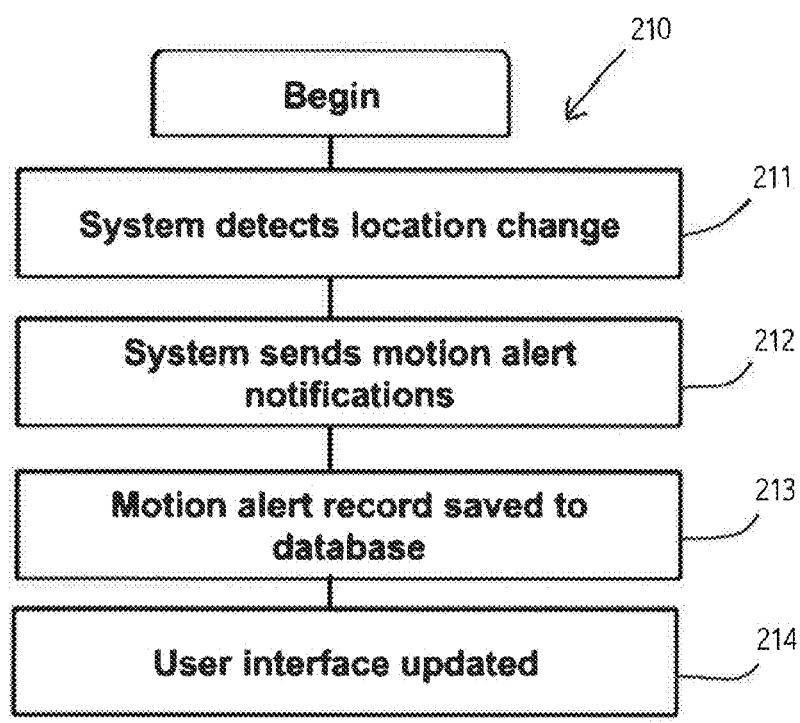
Figure 37:
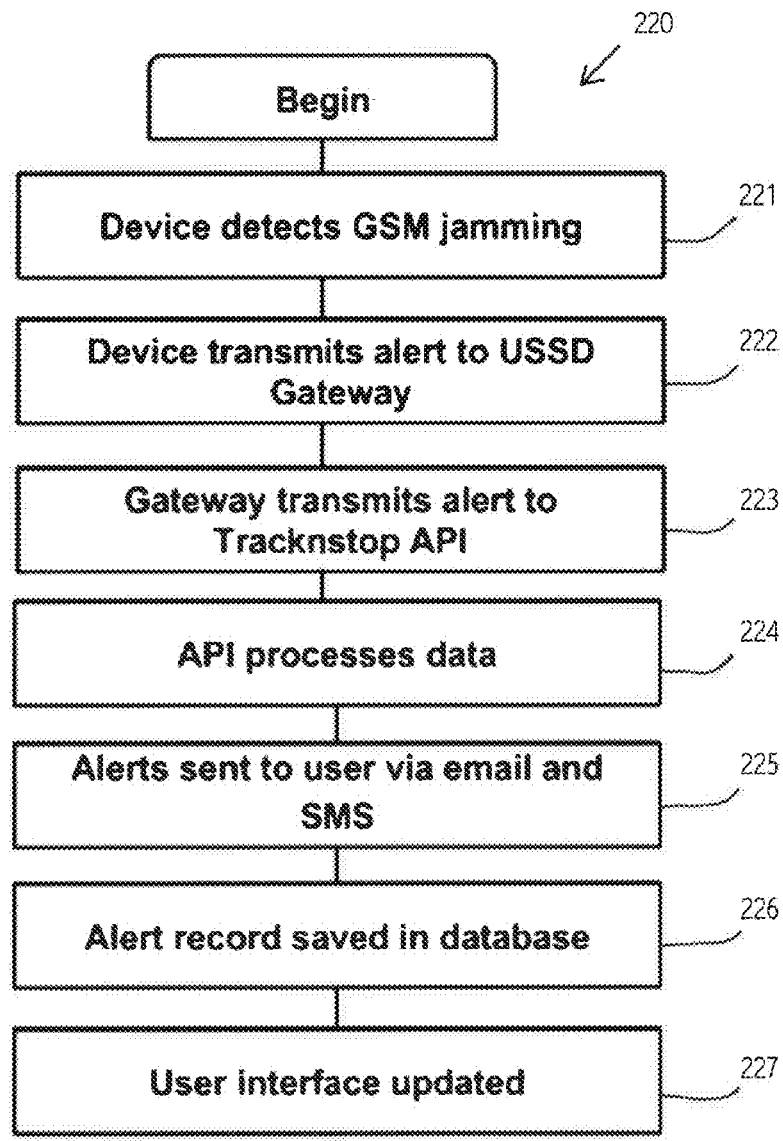
Figure 38:
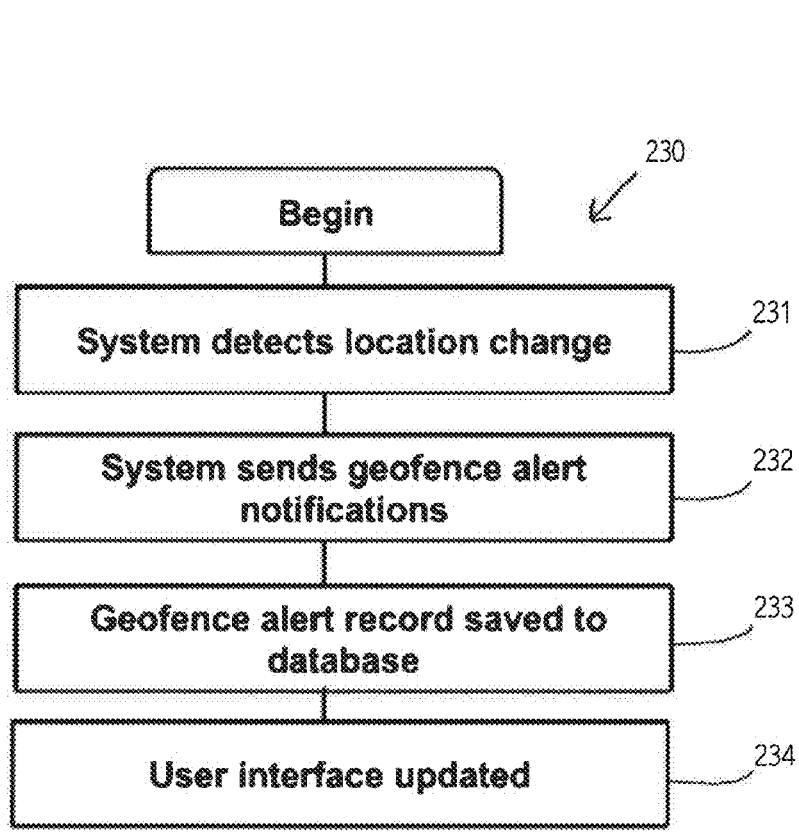

FIG. 10 is a stylised exploded view of a motion sensing means of the present invention, and FIGS. 11 to 24 are screen shots of user interface elements displayed on a user computing device executing application software implementing a control system according to the present invention, FIG. 25 is a flow diagram showing steps in a method of updating the location data of a vehicle according to the invention, FIG. 26 is a flow diagram showing steps in a method of displaying location data of a vehicle according to the invention, FIG. 27 is a flow diagram showing steps in a method of displaying location data of a vehicle on a specific date or range of dates according to the invention, FIG. 28 is a flow diagram showing steps in a method of obtaining a real-time location update of a vehicle according to the invention, FIG. 29 is a flow diagram showing steps in a method of rebooting a control device according to the invention, FIG. 30 is a flow diagram showing steps in a method of disabling and enabling a starter ignition for a vehicle according to the invention, FIG. 31 is a flow diagram showing steps in a method of controlling supply of power to a fuel pump of a vehicle to activate and deactivate the fuel pump according to the invention;

FIG. 32 is a flow diagram showing steps in a method of disabling and enabling motion alerts according to the invention;

FIG. 33 is a flow diagram showing steps in a method of disabling and enabling privacy mode according to the invention;

FIG. 34 is a flow diagram showing steps in a method of creating one or more geo-fences according to the invention;

FIG. 35 is a flow diagram showing steps in a method of activating and deactivating geo-fences according to the invention;

FIG. 36 is a flow diagram showing steps in a method of triggering motion alerts according to the invention;

FIG. 37 is a flow diagram showing steps in a method of triggering GSM jamming alerts according to the invention; and FIG. 38 is a flow diagram showing steps in a method of triggering a geo-fence breach alert according to the invention.

Figure 1:
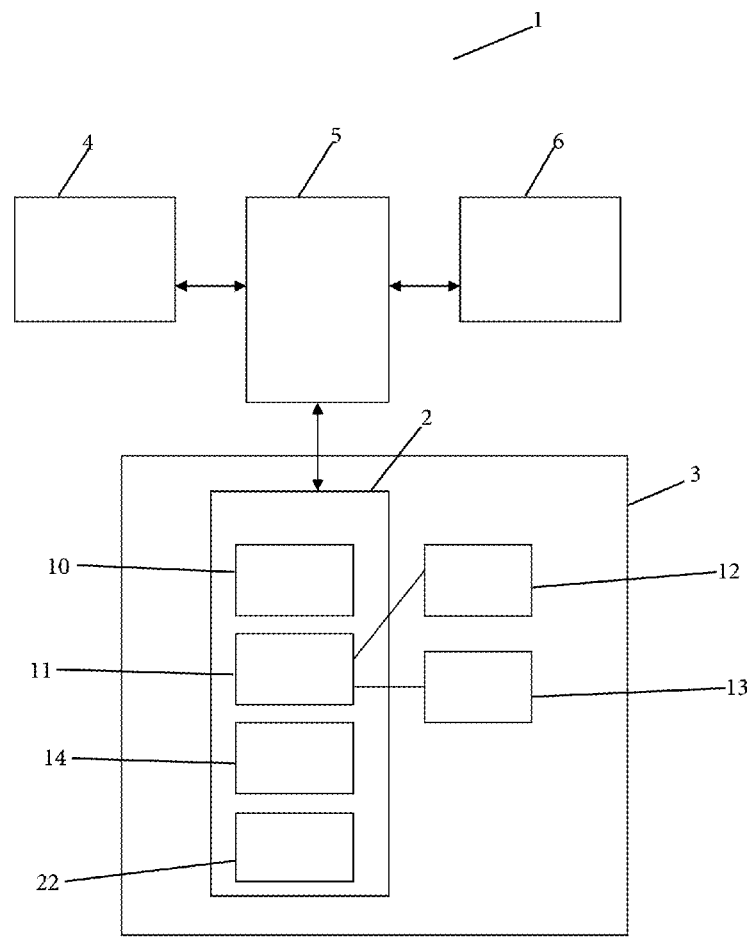
FIG. 1 is a block diagram of a control system for at least one powered vehicle comprising at least one control device according to the invention.
Figure 2:
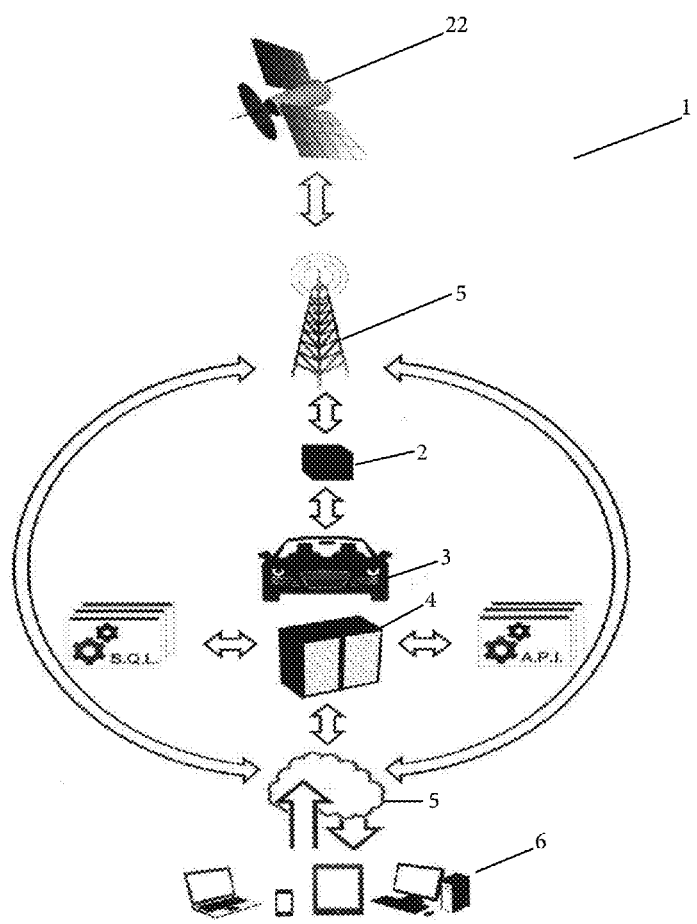
FIG. 2 is a stylised diagram of a control system for at least one powered vehicle according to the invention.
Figure 3:
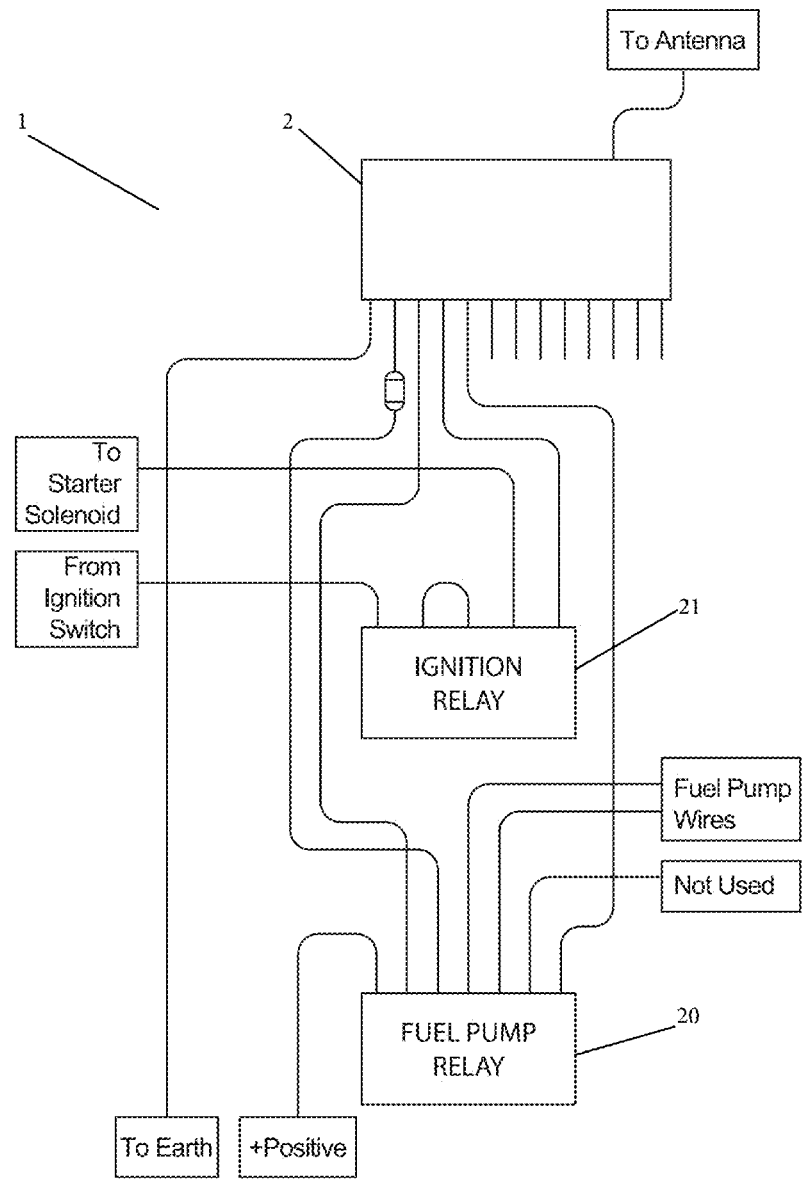
FIG. 3 is a block diagram showing a control device and switching means according to the invention.

Referring to the drawings and initially to FIGS. 1 to 3, there is shown a vehicle control system, indicated generally by the reference numeral 1 comprising at least one control device 2 which is fitted to a powered vehicle 3. Although FIG. 1 shows one control device 2 it will be understood that the vehicle control system 1 may comprise any number of control devices 2, in which each device 2 is fitted to a separate vehicle 3.

The system 1 further comprises a remote control computer server 4 which is connected to the or each control device 2 via a network 5, and at least one user computing device 6, such as a smart phone, laptop, personal computer or other computing device, which is connected to the remote control computer server 4 via network 5. It will be understood that the network 5 is a wired or wireless computer network, such as the internet, and two-way data transmissions are enabled between the control device 2 and the or each user computing devices 6 via the remote control computer server 4. A communications gateway, such as a USSD or M2M gateway may be communicatively coupled between the server 4 and the network 5 for enabling communications between the server 4 and the control device(s) 2 and/or user device(s) 6.

Figure 9:
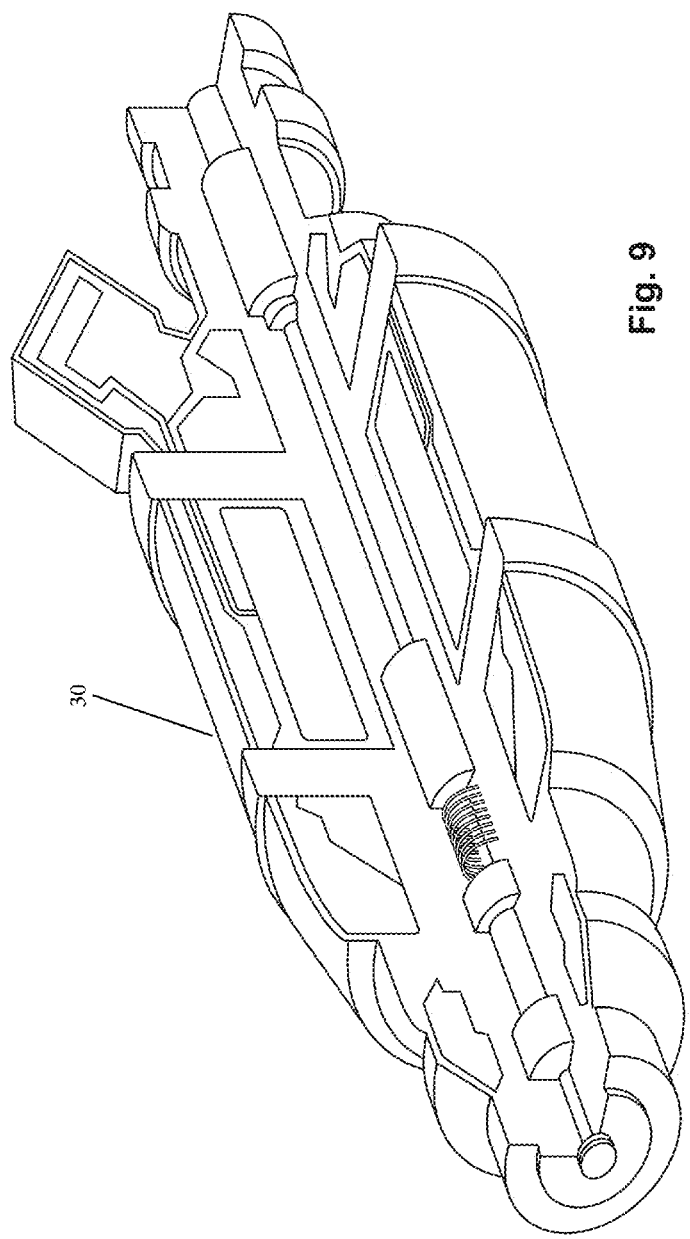
FIG. 9 is a cut away perspective view of a fuel injection valve according to the invention.

The control device 2 comprises a communications unit 10 and a control unit 11, and the control device 2 is coupled to a vehicle such that the control unit 11 may operatively control the fuel pump 12 of the vehicle 3. It will be understood that the fuel pump 12 of the vehicle 3 is operable to force fuel under pressure from the vehicles fuel tank to a fuel injection valve system 30, shown in FIG. 9, of the vehicle 3. The control device 2 is connected to the vehicle 3 intermediate a main fuse board/main power supply of the vehicle 3 and the fuel pump 12.

The control unit 11 comprises fuel pump switching means in the form of a fuel pump relay 20 operable to connect and disconnect the supply of power to the fuel pump of the vehicle 3 such that the fuel pump is activated and deactivated. The fuel pump relay 20 is installed intermediate the fuel pump and a main electrical power supply means of the vehicle and in-line with electrical power supply lines from the fuel pump to the main electrical power supply means of the vehicle.

The user computing device 6 is operable to execute a software application having an interface through which users, such as the owner of the vehicle and/or law enforcement agencies, may provide vehicle control input commands for the control device 2 so that the speed of the vehicle 3 may be controlled and/or the vehicle immobilised.

Figure 8:
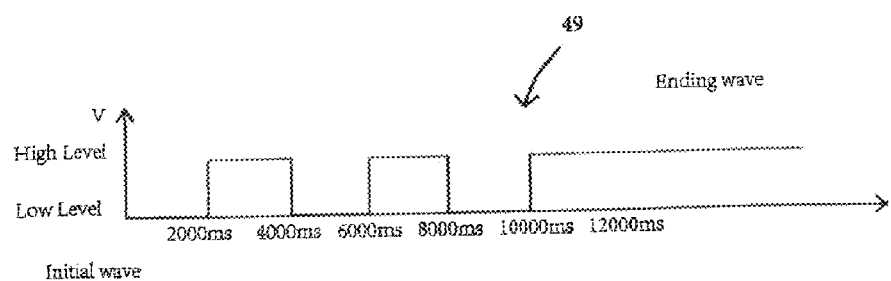
FIG. 8 is a graph showing a square wave digital output signal of the control device according to the invention.

Initially, a vehicle stop control input command is provided by a user to a software application interface executing on the user device 6, such vehicle stop control input commands are transmitted via the network 5 to the remote control computer server 4 where they are encoded into vehicle control signals encoding a triggering command to activate or deactivate the fuel pump 12 of the vehicle 3. The remote control computer server 4 then sends the vehicle control signals to the communications unit 10 of the control device 2 for processing by the control unit 11, which comprises a fuel pump relay 20 operable as a switch to activate and deactivate the fuel pump 12 by controlling the power supply to the fuel pump so that movement of the vehicle 3 is controlled in response to the vehicle control signal received by the communications unit 10. The control unit 11 is operable to activate and deactivate the fuel pump 12 by cutting the power supply to the fuel pump at timed intervals to safely bring to a stop the vehicle 3 by incrementally cutting fuel to the vehicles fuel injection system in controlled manner. A signal confirming that a moving vehicle 3 has been stopped is then transmitted from the communications unit 10 back to the remote control computer server 4 and/or to the user device 6 alerting users accordingly. FIG. 8 is a graph shows a square wave digital output signal 49 of the control device according to the invention, which turns on and off a relay switch which is attached to the power supply of the fuel pump mechanism within the vehicle. By controlling power supply to the fuel pump it is 'turned on' and then 'turned off' a number of times, such as one, two, three, four, five or more times, in a row with intervals of one or more seconds within each increment, and eventually ending in the 'off position, to bring a moving vehicle to a gradual stop. Once this process is complete the vehicle will also no longer be able to be started due to there being no power being allowed to the fuel pump mechanism.

The control unit 11 further comprises fuel level indicator setting means operable in response to the vehicle control signal to set a fuel level indicator gauge of the vehicle. The fuel gauge of the vehicle may thus show as empty to provide an indication that the vehicle has run out of fuel even though there may still remain fuel in the fuel tank when the movement of vehicle is controlled according to a vehicle control signal.

Use of a fuel cut method as described above is designed to work in conjunction with authorities providing them with the ability to pro-actively stop a vehicles theft/hijacking in a safe manner while the vehicle is in motion.

Figure 4:
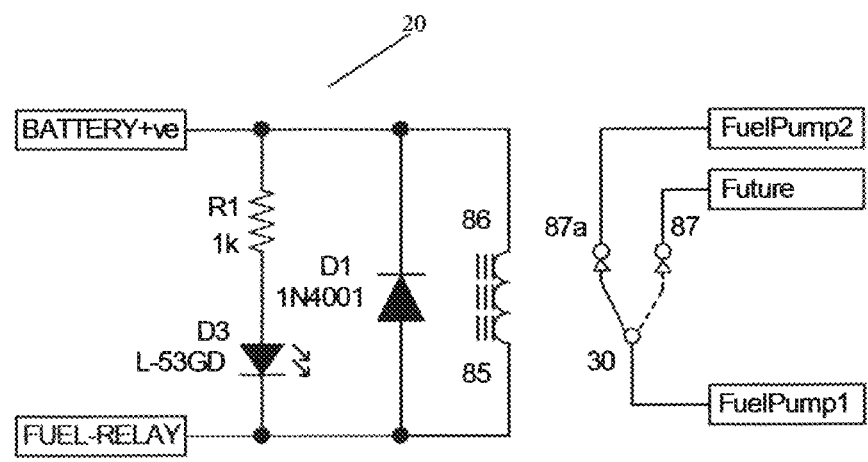
FIG. 4 is a circuit diagram of fuel pump switching means according to the invention.

An implementation of a fuel pump switching means 20 is shown in FIG. 4. As shown, a vehicle control signal, shown as "fuel-relay" signal, is sent from the control unit 11 and activates the fuel pump switching means 20 when a command is received by the control unit 11 from the remote computer 4. The relay 20 cuts the vehicles fuel pumps 12/24 Volt power from the main power supply. A vehicles fuel injection wire can also be cut using the relay 20 to provide the same result. A SIM card within the control device 2 receives the vehicle stop control input command requesting the relay 20 connected to the vehicle to disconnect power to the vehicles fuel pump 12. This causes the vehicle to stutter to a stop giving the sensation to the driver that the vehicle has run out of fuel. The vehicle's fuel pump is not reactivated until a re-immobilisation command is sent to the device 2. The fuel pump switching means 20 further comprises an LED light operable to illuminate when the fuel pump switching means is switched on. The fuel pump relay 20 of the fuel pump switching means thus controls power supply to the vehicles fuel pump. The control device 2 together with the fuel pump switching means 20 is operable to interrupt power supply to the fuel pump to thereby control fuel supply to the injection system of the vehicle.

The present invention provides a control device complete with all wiring and connections, including a relay switch, to enable the control of a vehicle via programmed commands, and to ensure a standard installation within all vehicles for engineers irrespective of the make and/or model of the vehicle. A command, such as a USSD command, sent via SMS to stop the fuel pump from working cuts power to the pump or to the vehicles fuel injectors.

Figure 5:
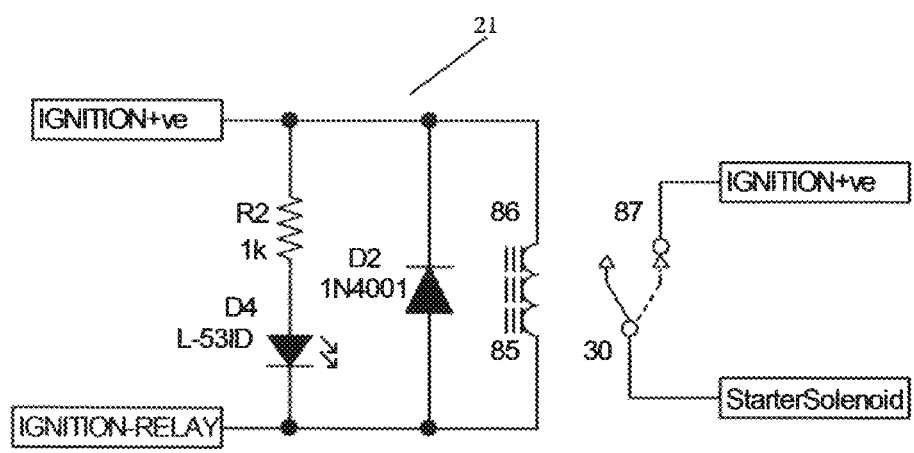
FIG. 5 is a circuit diagram of ignition system switching means according to the invention.

An implementation of an ignition system switching means 21 is shown in FIG. 5. As shown, the control unit 11 is further coupled to an ignition system 13 of the vehicle 3 and comprises an ignition system switching means, shown in FIG. 5 in the form of an ignition system relay 21 operable to control the supply of power to the ignition system 13 to activate and deactivate the ignition system such that the vehicle is immobilised and mobilised in response to a vehicle control signal, shown as "ignition relay" signal in FIG. 5, from the remote computer 4. The ignition system switching means 21 is connected in-line with electrical power supply lines from the ignition system to the main electrical power supply means of the vehicle. The ignition system switching means 21 further comprises an LED light operable to illuminate when the ignition system switching means is switched on. The ignition system switching means 21 controls power to the vehicles solenoid on the starter motor. The ignition system relay 21 is operable to cut the power supply to the ignition valve system 13 so that the ignition system 13 is deactivated to cause the vehicle 3 to be immobilised. The communications unit 10 is further operable to receive a vehicle control signal to reactivate the ignition system 13 so that the vehicle 3 may be subsequently mobilised when required to be driven.

To immobilise a vehicle 3, initially, a vehicle immobilisation control input command is provided by users to the software application interface executing on the user device 6. This immobilisation command is transmitted via the network 5 to the remote control computer server 4 where it is encoded into vehicle control signals encoding a triggering command to deactivate the ignition system of the vehicle 3. The remote control computer server 4 then transmits the vehicle control signals to the communications unit 10 of the control device 2 for processing by the control unit 11, which controls an ignition system relay 21 operable to cut the power supply to the ignition system 13 so that the vehicle 3 may not be started. A signal confirming that a vehicle 3 has been immobilised is then transmitted from the communications unit 10 back to the remote control computer server 4 and/or to the user device 6 alerting a user accordingly. To then mobilise the vehicle 3 so as to enable to the vehicle 3 to be driven a vehicle mobilisation control input command is provided by users to the software application interface executing on the user device 6. This vehicle mobilisation command is also transmitted via the network 5 to the remote control computer server 4 where it is encoded into vehicle control signals encoding a triggering command to activate the power supply to the ignition system of the vehicle 3. The remote control computer server 4 then transmits the vehicle control signals to the communications unit 10 of the control device 2 for processing by the control unit 11, which controls the ignition system relay 21 to allow power supply to the ignition system 13 so that the vehicle 3 may be started. A signal confirming that a vehicle 3 has been subsequently mobilised is then transmitted from the communications unit 10 back to the remote control computer server 4 and/or to the user device 6 alerting the user accordingly.

The vehicle immobilisation control command is sent from the remote control computer server 4 via a USSD gateway and/or SMS (GPRS) gateway using cloud technology 5 to the tracking device 2 installed within a vehicle 3.

A gateway, such as a USSD gateway, may be communicatively coupled between the remote control computer server 4, control device 2 and user device 6 via cellular network 5.

USSD provides a cost effective method to send/receive an average of 300 messages per day between servers and devices. USSD is a GSM network backbone messaging network, so if there is GSM coverage, then USSD is available and preferable for use over GPRS and SMS. The USSD messaging protocol is extremely lightweight and offers close to instant two way communications between device and server.

The present invention integrates a web-based API for sending and receiving USSD messages. In contrast to USSD, GPRS requires that fairly resource heavy servers be set up to listen for GPRS messages. The USSD API of the present invention relays messages to servers via HTTP Post requests. The present invention implements a USSD enabled tracking and vehicle control device within an "under the dash" tracking and vehicle control device. The communications unit 10 of the control device 2 provides a link to enable the control device 2 to connect to the servers 4 via a custom web API, which acts as a 'middle-man' between the server software and the control devices 2 located in the vehicles 3. In operation, each device 2 is mapped according to their IMEI (International Mobile Station Equipment Identity) and by the MSISDN (Mobile Station International Subscriber Directory Number) of the SIM within the control device 2 and allows users to send commands to the control devices 2 via server 4.

This API also listens for incoming messages and routes them to the appropriate records within the system database. This functionality is what allows the system to store location and device event information, which in turn, allows the provision of live tracking and also location history. As USSD does not support message queues the communication from and to the control device were adapted such that the API sending the USSD message will wait for a particular response from the control device (depending on the command sent) and will resend the message if the correct response is not received after a certain period of time.

The vehicle immobilisation control input command cuts the cranking or starting wire of the vehicles ignition key causing the vehicle 3 to drive as normal with no effect or knowing to the driver until it is switched off, and from then on it will not allow the vehicle to be started, until the de-immobilisation command is sent.

Figure 6:
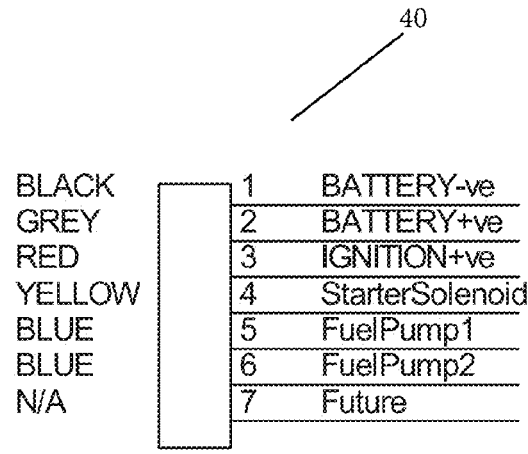
FIG. 6 is a block diagram showing connections of the switching means to a vehicle according to the invention.

FIG. 6 shows the connections 40 of the switching means 20, 21 to the vehicle. In the implementation shown, BATTERY −ve is the negative terminal of the battery; BATTERY +ve is the positive terminal of the car battery; IGNITION +ve is the power to the starter solenoid from the key; StarterSolenoid is the connection to the solenoid of the starter motor of the vehicle; FuelPump1 and FuelPump2 is the connection to the power line for the fuel pump, and Future is for a future function.

Figure 7:
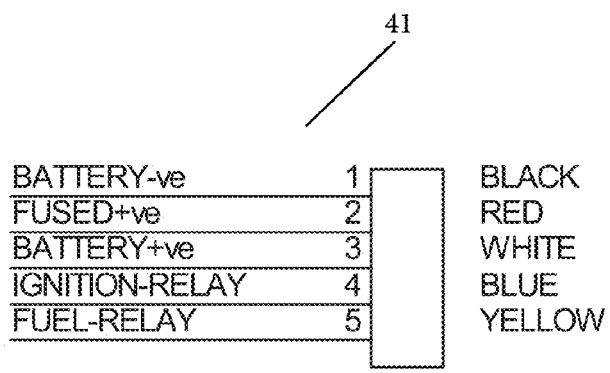
FIG. 7 is a block diagram showing connections of the switching means to the control device according to the invention.

FIG. 7 shows connections 41 of the switching means 20, 21 to the control device 2. In the implementation shown, BATTERY −ve is the negative terminal of the car battery; FUSED +ve is to power after the fuse in the PCB; BATTERY +ve is the positive terminal of the car battery; IGNITION-RELAY is the connection to activate and operate the ignition relay 21 to prevent the car being started; FUEL RELAY is the connection to operate the fuel pump relay 20 to control power to the fuel pump of the vehicle.

The provision of a vehicle wiring harness and connections as shown in FIGS. 3 to 7 comprising in-line fuse and relays 20, 21 for taking control of vehicle components such the ignition and fuel pump power is thus provided. The in-line fuse adds additional safety and the vehicle wiring harness is installed upstream or after a vehicle's main power supply fuse board so that the vehicle manufacturer's safety features are not circumvented or bypassed. The vehicle wiring harness is designed to be fitted into all vehicles types.

The vehicle wiring harness and connections shown in FIGS. 3 to 7 are implemented in the form of a PCB (Printed Circuit Board) for assembly into a final product for connection to a vehicle.

The vehicle control signals from the remote control computer server 4 may be transmitted as USSD messages, GPRS signals and/or text messages. A SIM card within the control device 2 is programmed to receive a USSD, GPRS and/or SMS command generated by the remote control computer server 4 requesting the relays 20, 21 connected to the vehicle 3 to disconnect power to the vehicle's ignition system 13 and to incrementally cut power to the fuel pump 12 through sending repeated commands to the pump 12 causing a gradual stutter to a stop giving the vehicle driver a sensation that the vehicle has run out of fuel.

The control device 2 further comprises motion sensing means 14 operable to sense movement of the vehicle 3 and to transmit movement data to the remote control computer server 4. The motion sensing means 14 is further adapted to detect an impacting force on the vehicle 3, in which detection of an impacting force triggers the transmission of an impact detection signal from the communications unit 10 to the remote computer 4 and automatically generates a channel for audio communication from audio input/output means of the vehicle 3 to the remote computer 4. The integration of such two way communication using the on board motion sensor 14 will allow communication with emergency services if the vehicle 14 has had a front, rear or side impact or if the vehicle 3 has turned over. Upon recognition that an accident has occurred the communications unit 10 of the device 2 immediately places a two-way call from the vehicle to emergency services. G-force impact information may be gathered by the motion sensing means 14 for transmission to the emergency services. To integrate the required two way communication from the vehicle 3 a speaker and microphone or other audio input/output may be installed in the vehicle and the communications unit 10 is programmed to make an emergency call from within the vehicle 3, such as with the use of a pre-programmed SIM card. The device 2 has an internal back-up battery in the event of vehicle power failure on impact. Location mapping services are immediately available to emergency services with full implementation with other mapping platforms.

FIG. 10 shows suitable motion sensing means in the form of a motion sensor 14. The sensor 14 comprises of 3-axis accelerometers, 3-axis gyros, & 3-axis magnetic sensors. The sensor 14 uses a right-handed coordinate system. A positive yaw angle is defined as a positive right-handed rotation around the Z-axis. A positive pitch angle is defined as a positive right-handed rotation around the X-axis. A positive roll angle is defined as a positive right-handed rotation around the Y-Axis. Complete 360 degrees range of motion with continuous attitude configuration is provided. The sensor 14 is calibrated for static accuracy to 0.5° in pitch/roll and 2.0° heading/direction; for bias, scale factor, misalignment and gyro G-Sensitivity (Impact G-Force); for computing and giving outputs in real-time with real-time magnetic and acceleration disturbance rejection, dynamic filter tuning, adaptive filter signaling.

Other specification attributes for the motion sensing means 14 include: Altitude & Heading-Range (Heading/Roll): +/−180°; Range (Pitch): +/−99°; Static Accuracy (Heading): 2.0°; Static Accuracy (Pitch/Roll) 0.5° Angular Resolution: <0.05° Repeatability: <0.2 degrees; Output Rate: 200 Hz. Gyro Specification: Range: ±2000°/s; In-Run Bias Stability: <10°/hr; Bandwidth: 256 Hz; Alignment Error: ±0.05°. Accelerometer Specification: Range: ±16 g; Linearity: <0.5% FS; Bandwidth: 260 Hz; Alignment Error: ±0.05°.

Two way communication by installation of additional microphone and speaker. Device Back-Up Battery/Independent Power. White-list for calling and enquire position. Motion unit reads Accident Detection & Flip Over. Motion Unit also reads movement to send Motion Alerts to Clients. Programmed to detail driving behaviour such as acceleration, cornering and/or braking.

The control device 2 further comprises vehicle position tracking means 22 operable to capture location data, such as GPS data, for the vehicle 3 and transmit the location data to a GPS server to enable the location of the vehicle 3 to be tracked. Such real time tracking information is also made available via the remote control computer server 4 and/or the user device 6 alerting the user of the vehicles location accordingly.

The communications unit 10 is operable to receive and to transmit to the remote control computer server 4 and/or the user device 6 data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts.

The present invention also relates to a control system 1 for at least one powered vehicle 3 comprising: a remote control computer server 4 connected by a computer network 5 to a least one immobilisation device 2, and at least one user computing device 6.

The present invention provides a vehicle tracking solution where a vehicle owner can track the whereabouts of their vehicle on any networked device. Additionally, the present invention provides a remote control disable function for the vehicle owner, whereby the owner can remotely disable the car, cutting vehicle ignition and providing the ability for monitoring stations and authorities to safely stop the vehicle by gradually cutting fuel to the vehicles fuel injection system by controlling the vehicles fuel pump.

The present invention improves security to existing tracking devices, with its remote immobilisation adding value to previous security features of existing tracking devices. The provision of a security feature known as the "disable button" which is provided on a user interface on application software executing on a user computing device enables a vehicle owner to remotely slow to stop and disable a vehicle so it cannot be started until they send a re-enable command through USSD/SMS/GPRS communications. The present invention can safely stop a moving vehicle incrementally by cutting fuel to the fuel pump through our monitoring services in conjunction with authorities.

A vehicle owner may, via a user computing device executing application software for the present invention, log in remotely and stop and/or immobilise the vehicle so that the next time the vehicle stops it may not be started again, thereby eliminating the dangers associated with pursuing a stolen vehicle and minimising risk to law enforcement, vehicle owners and innocent bystanders The immobilisation vehicle control signal is sent from a web server in the form of a remote control computer server 4 via SMS and/or GPRS and USSD using a cloud based gateway to the control device 2 installed on a vehicle. A command sent from the remote control computer server 4 is coded to communicate with the control device 2 installed within the vehicle to request a relay 20, 21 wired into the vehicle 3 to cut power to the ignition system 13 or incrementally cut power to the fuel pump 12. An ignition stop or disable command transmitted to the remote control computer server 4 ensures that the ignition not work again after the vehicle is next stopped until a re-enable command is sent to the vehicle through the remote control computer server 4 to the control device 2 installed within the vehicle. A fuel stop command is sent in the same way which thereafter pings the fuel pump several times which brings the vehicle to a controlled incremental stop while it is in motion. The use of relays 20, 21 avoids bypassing any manufacturers installed safety systems and vehicle fuses.

The control device 2 further comprises position tracking means 22 for transmitting GPS coordinates via USSD, GPRS and or SMS signals to enable the mapping location of the vehicle, such as to a user computer device 6, such as a smart phone via the software application, or to the remote control computer server 4.

The position tracking means 22 sends packets of information to the to the remote control computer server 4 at a set interval (for example, every five minutes). Each time a packet is received, the remote control computer server 4 follows a process of validating the source of the data packet, and if data source is verified then parsing the information within the packet and storing the information in a database coupled to the remote control computer server 4 according to the user device 6 it was sent from. Details including the time stamp of the received packet as well as latitude/ longitude co-ordinates, current speed, direction, for the vehicle may also be included in the packet and stored in the database.

Location mapping for a vehicle 3 is displayed via a web application using such online utilities as Google Maps API in conjunction with the location records stored in the database. When a user selects to view the current location of their vehicle, the web application follows this process: queries the database for the selected vehicles most recent location record and displays the vehicle location based on the longitude and latitude values returned from the database for that particular vehicle Speed change or unusual movements, with early warning while vehicle 3 is being broken into or being stolen, are also provided by the present invention using motion sensing means. Once movement is sensed by the motion sensor on the control device 2 installed within the vehicle an alert is sent, such as by SMS text to a mobile number(s) entered by a user in an administration section of the software application executing on the user device 6.

Text message alerts are also provided if the vehicle 3 leaves a specified safety zone or geo-fence. Once a vehicle with an installed control device 2 leaves a specified geo-fence/safety zone an alert is sent via SMS Text to the mobile number(s) entered by a client in the administration section on the online tracking panel and application software executing on the user computer device 6.

Any attempt to block and thereby prevent transmissions to and from an installed control device 2 to the remote control computer server 4 will result in the control device 2 automatically, via the control unit 11, transmitting a vehicle shutdown control signal operating one or more relays to render the ignition system 13 and fuel pump 12 of the vehicle 3 unusable until a re-enable command is sent to the control device 2. Such a vehicle shutdown control signal comes directly from the control device 2 on detection of jamming equipment and therefore does not require the existing communication network 5 to enable the function.

The software application for the present invention may be implemented as an online web service.

The software application allows a user to query the history of the control device 2 so that a vehicles location history may be viewed. When a user selects a date to view the location history the application software initially queries the database for all location records matching the device and the selected date and then displays each location record as a point on a Google map widget and displays a table of times, locations and, optionally, the addresses for each location point. The device history may also be obtained including specific alerts and device notifications. To obtain the device history records users select a desired date period and a table of alerts and notifications based on the date and time of the alert is displayed, including motion alerts, geo-fence alerts, GSM jamming detection notifications, device rebooted notifications, ignition disabled/enabled notifications and fuel pump cut/enabled notifications.

FIGS. 11 to 24 are screen shots of user interface elements displayed on computing devices executing application software implementing a control system and device according to the present invention.

Figure 11:
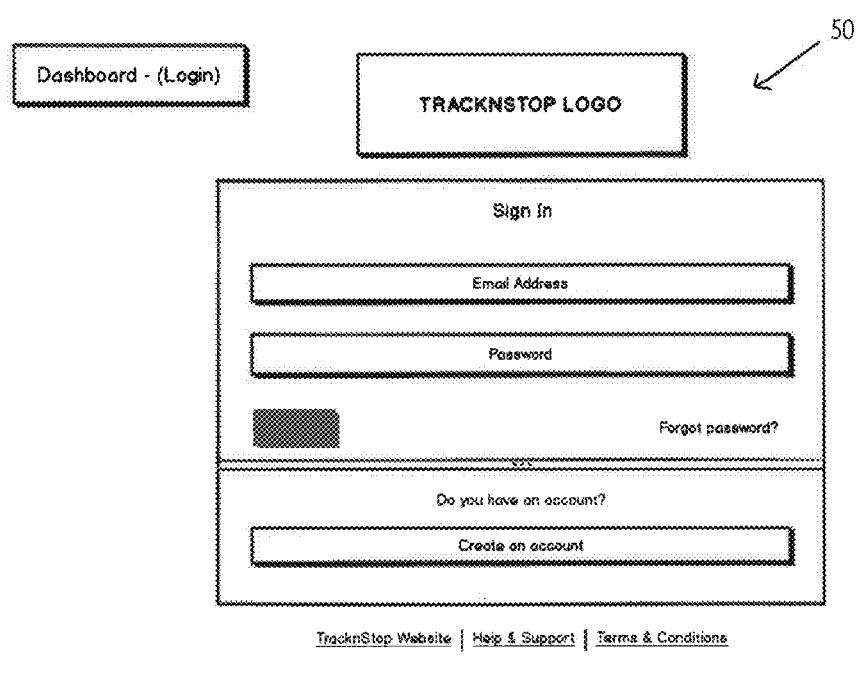
Figure 12:
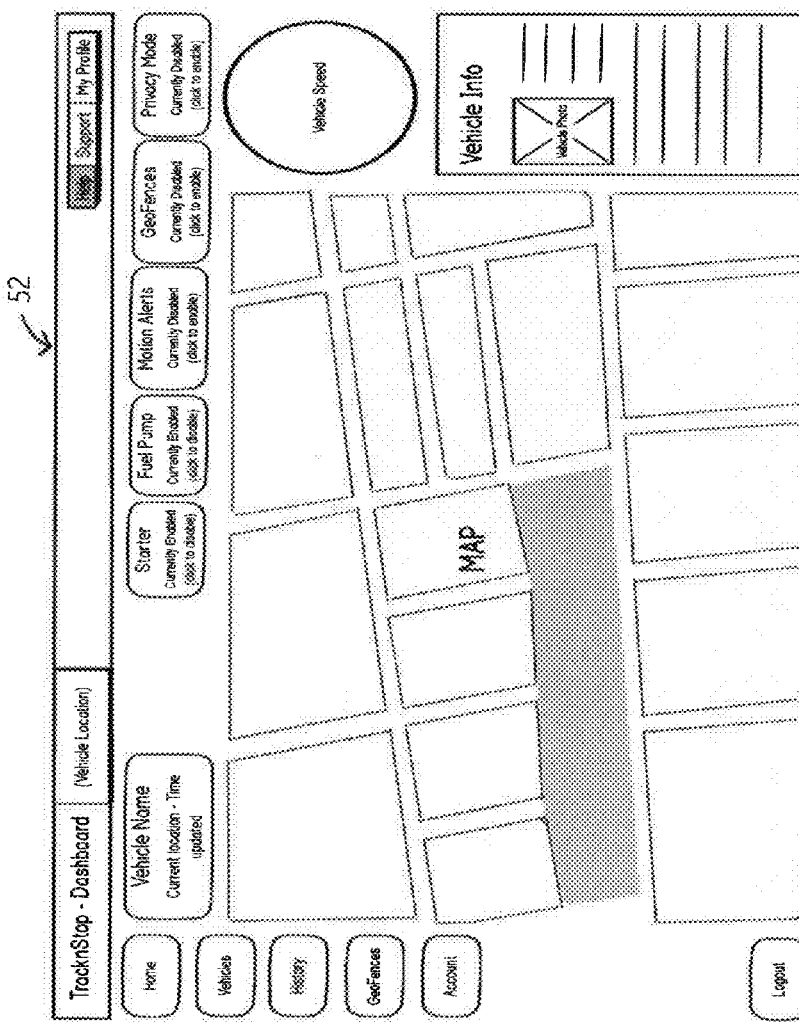
Figure 13:
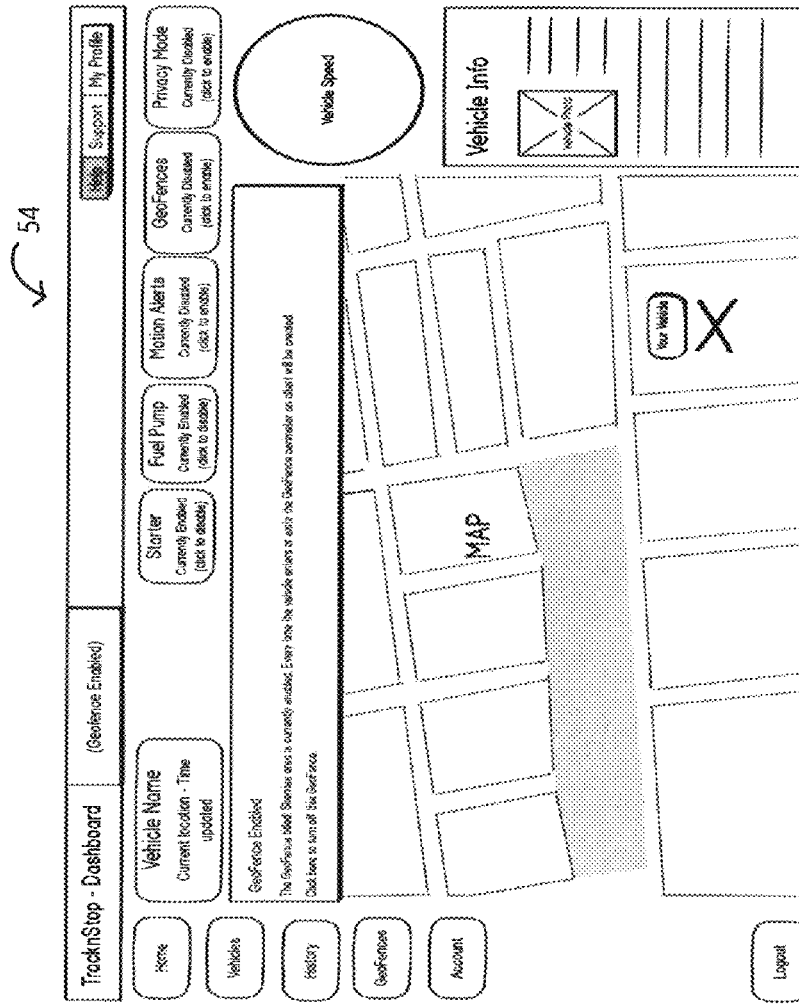
Figure 14:
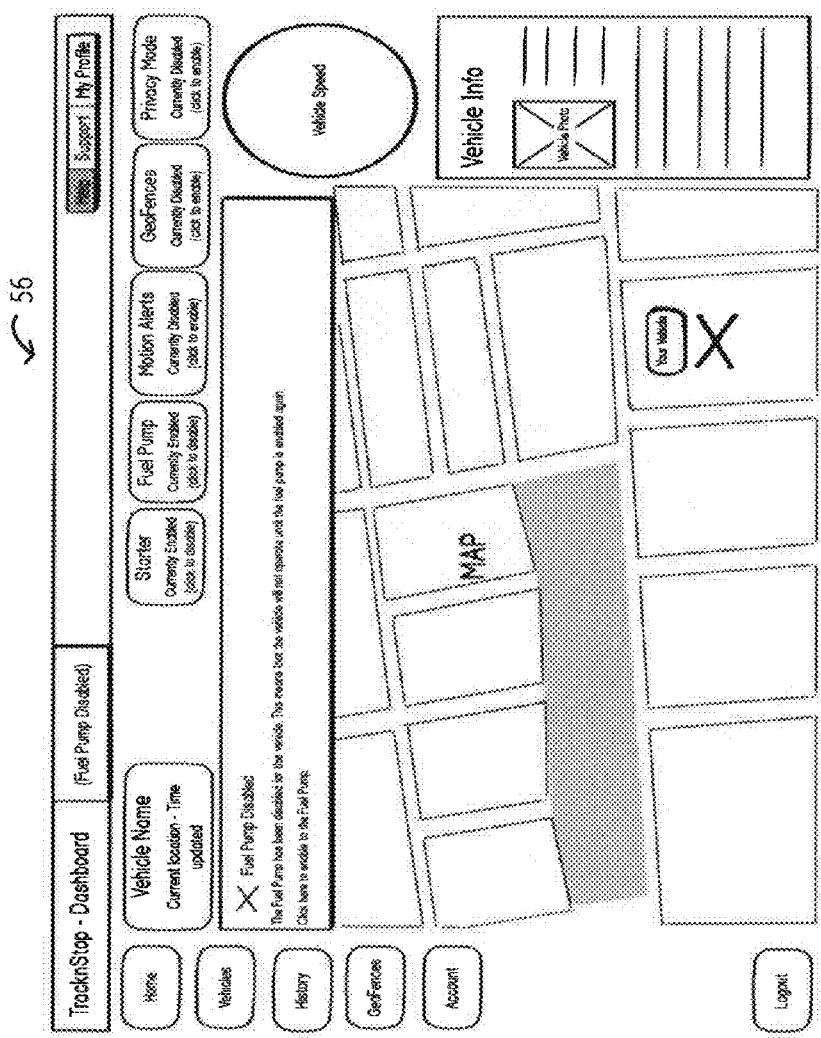
Figure 15:
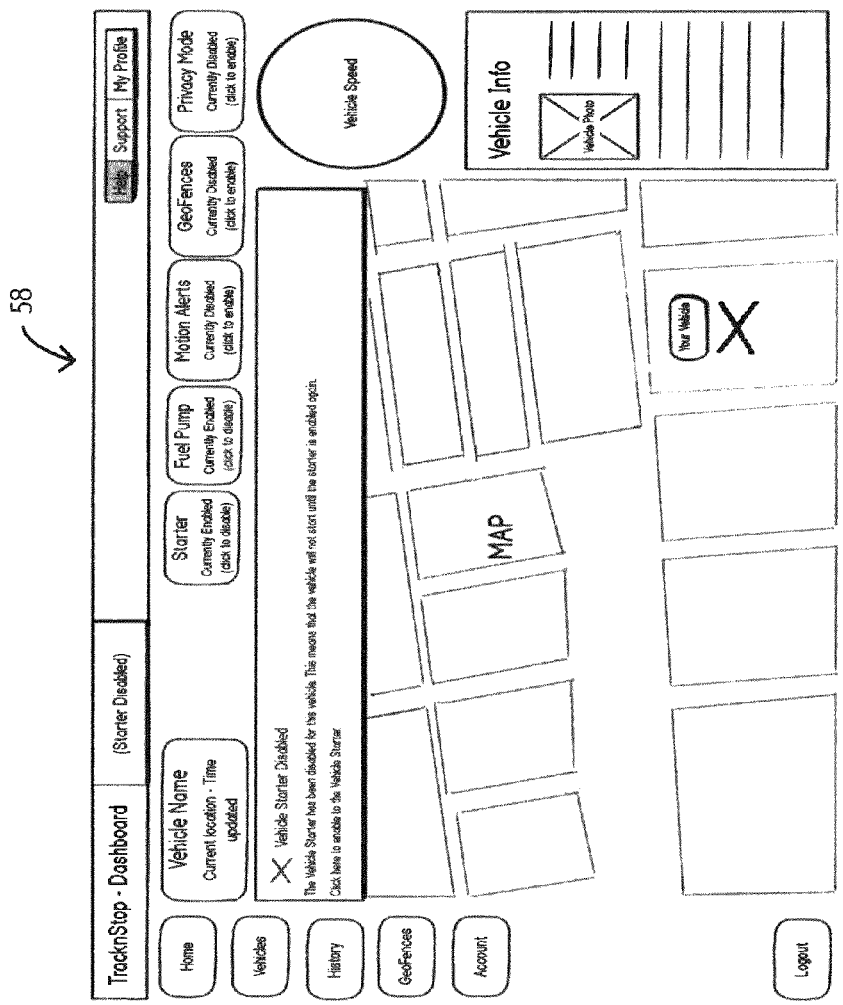
Figure 16:
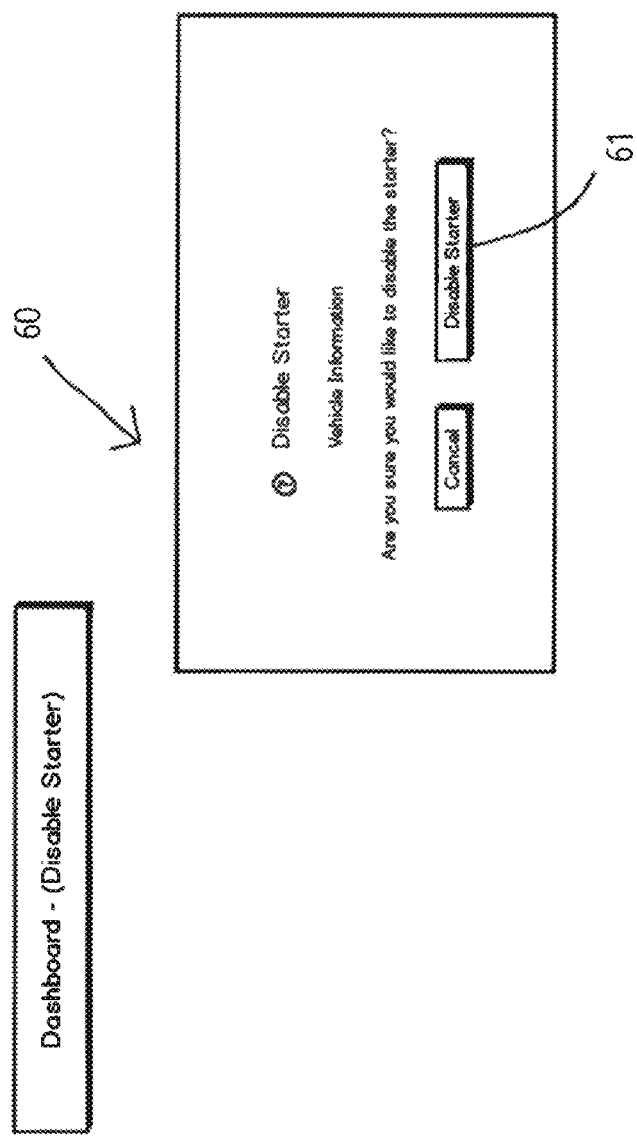
Figure 17:
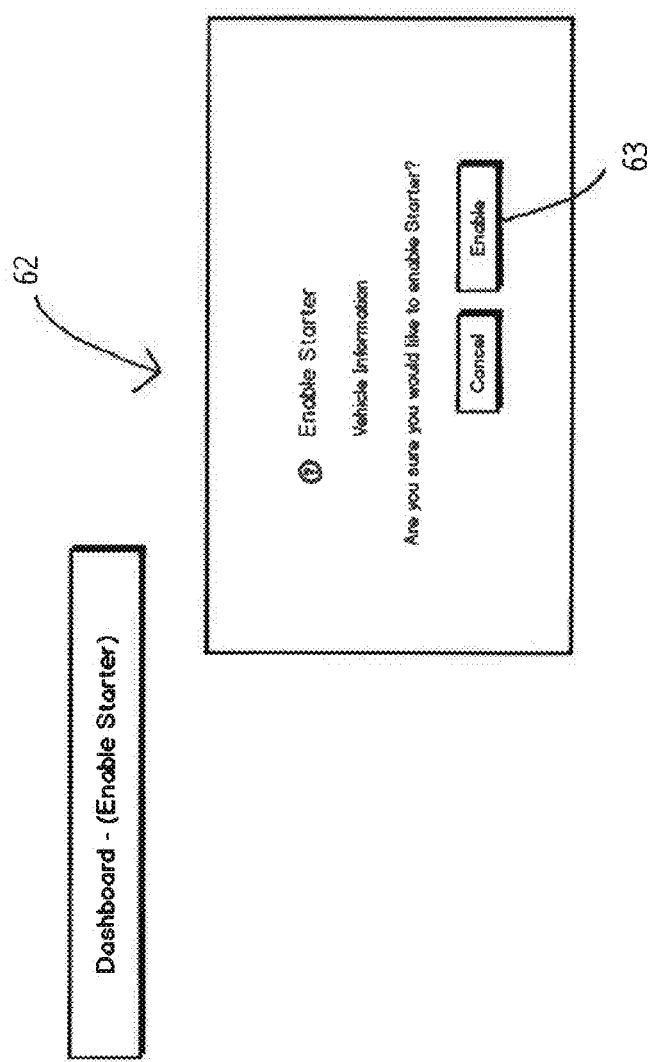
Figure 18:
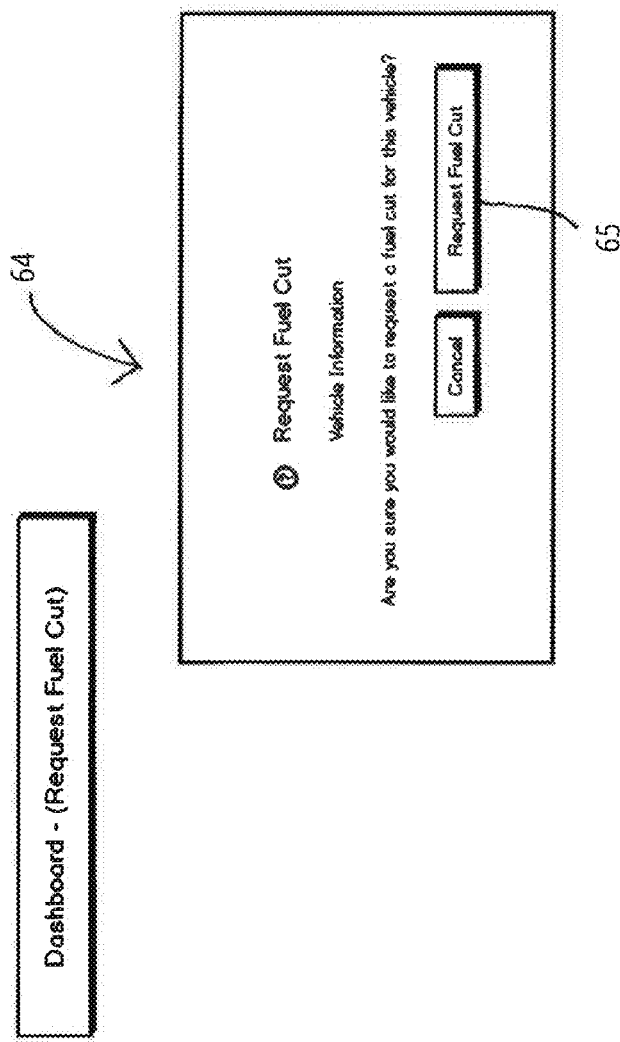
Figure 19:
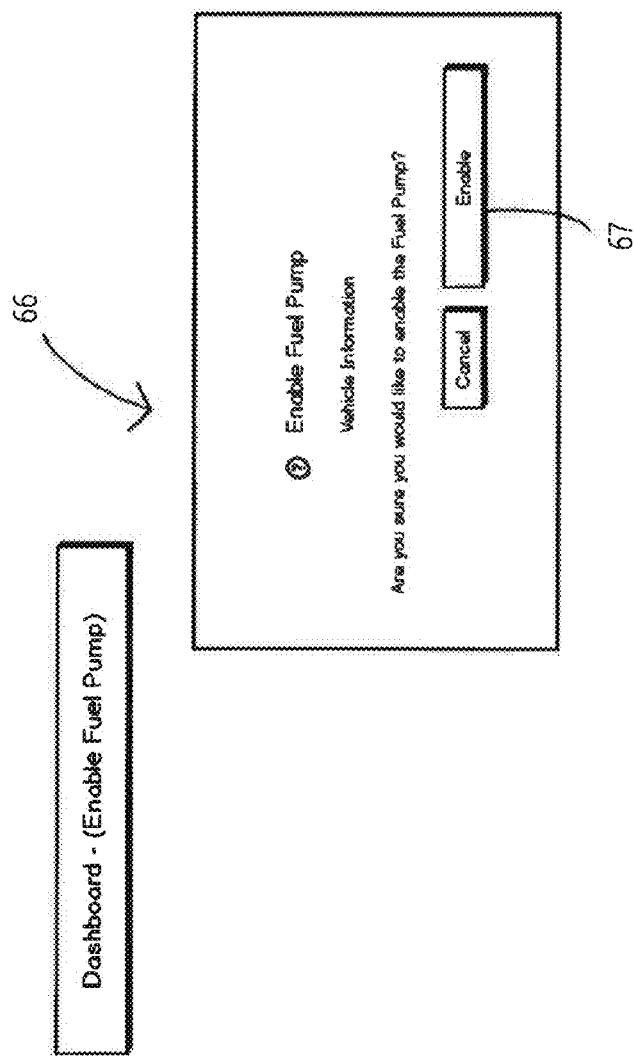
Figure 20:
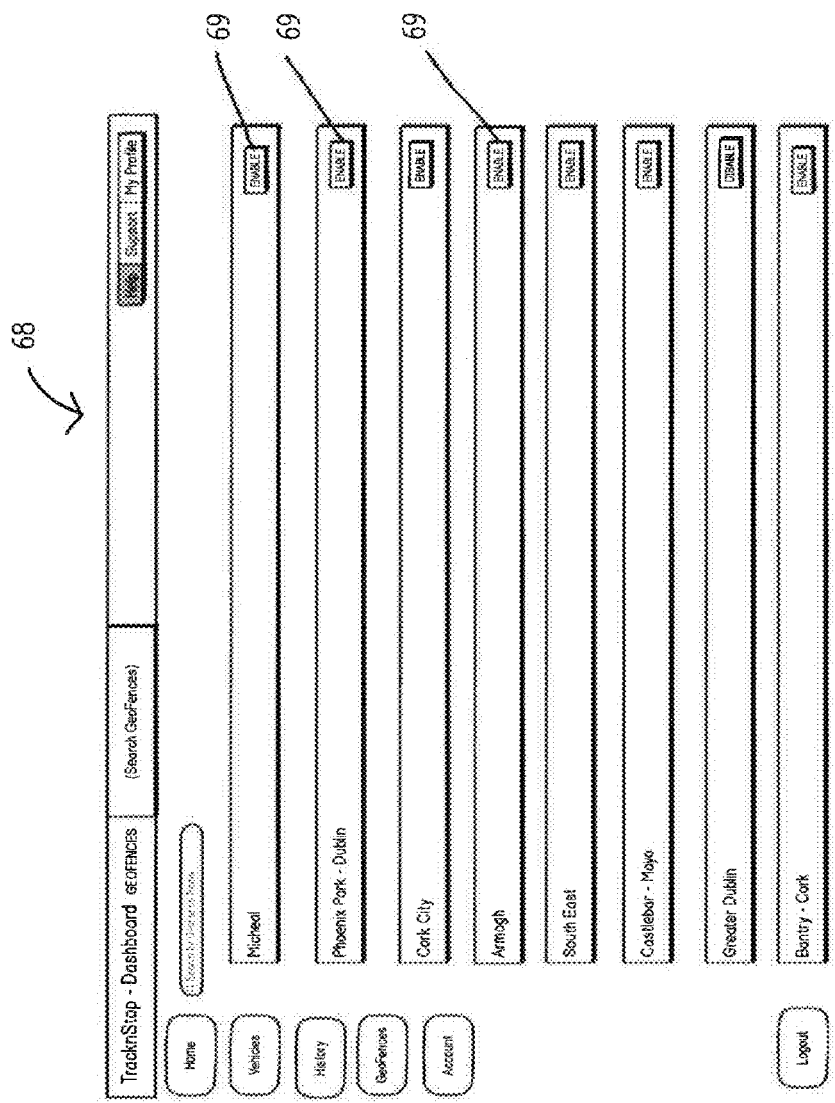
Figure 21:
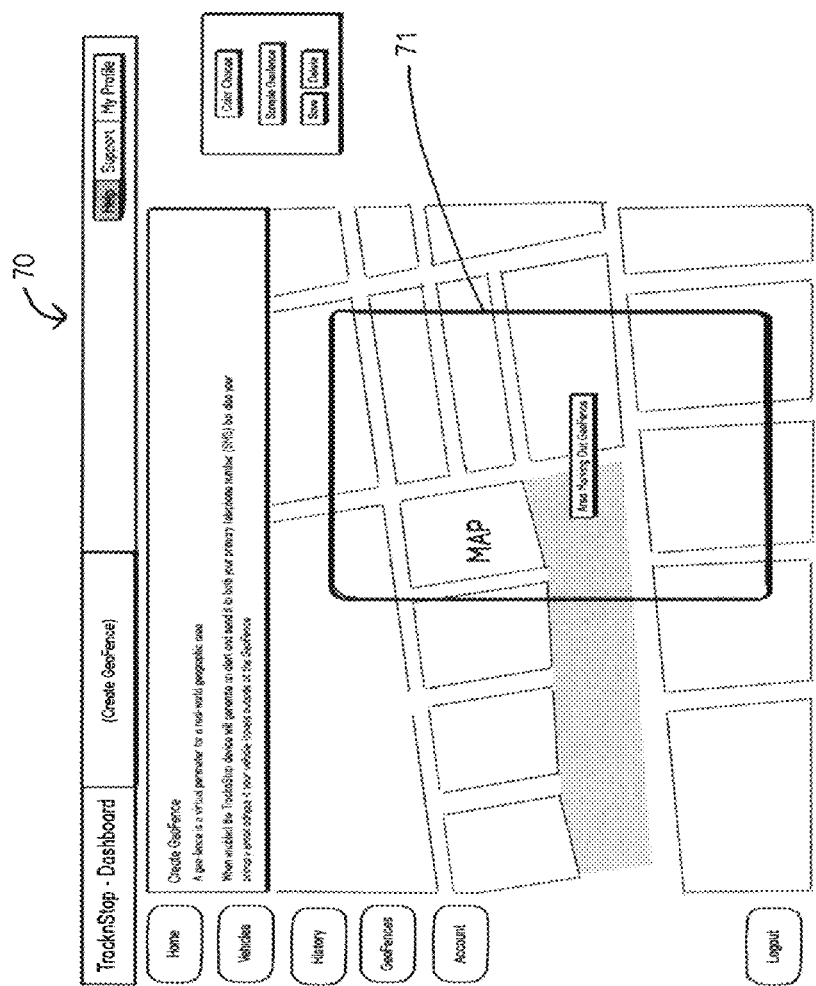
Figure 22:
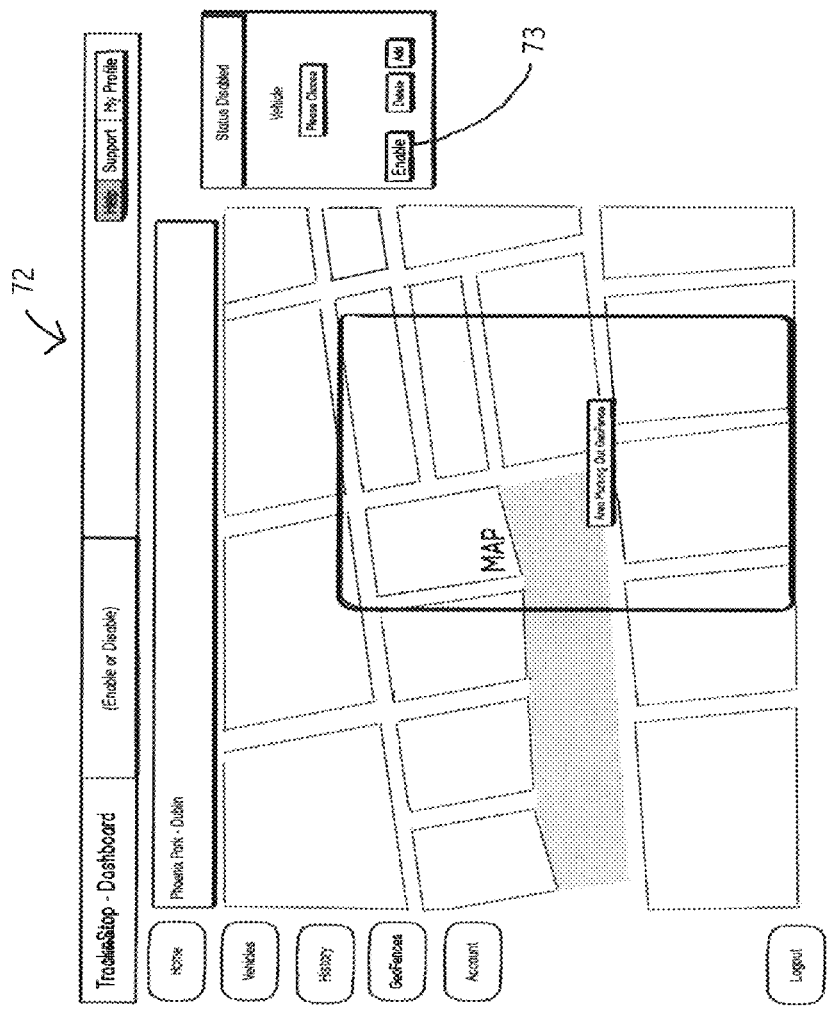
Figure 23:
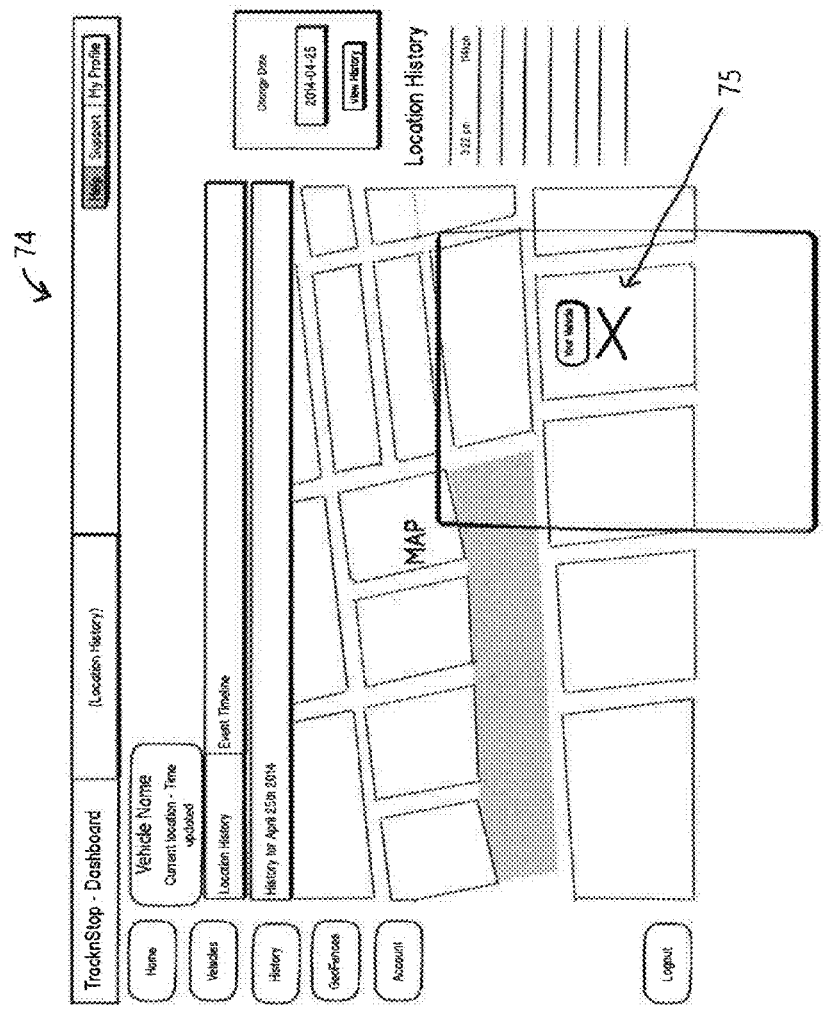

FIG. 11 shows a log in user interface screen 50 displayed on a user computing device. FIG. 12 shows a dashboard location user interface screen 52 displayed on a user computing device. FIG. 13 shows a geo-fence enabled user interface screen 54 displayed on a user computing device. FIG. 14 shows a fuel pump disabled user interface screen 56 displayed on a user computing device. FIG. 15 shows a vehicle ignition starter disabled user interface screen 58 displayed on a user computing device. FIG. 16 shows a disable vehicle ignition starter screen 60 and an interactive disable starter icon 61 displayed on a user computing device. FIG. 17 shows an enable vehicle ignition starter screen 62 and an interactive enable starter icon 63 displayed on a user computing device screen. FIG. 18 shows a request fuel cut screen 64 and an interactive request fuel cut icon 65 displayed on a user computing device. FIG. 19 shows an enable fuel pump screen 66 and an interactive enable fuel pump icon 67 displayed on a user computing device. FIG. 20 shows a search geo-fences screen 68, with icons 69 for enabling and disabling geo-fences displayed on a user computing device. FIG. 21 shows a create geo-fence screen 70 and a boundary icon 71 for marking out or defining boundaries for a geo-fence displayed on a user computing device. FIG. 22 shows an enable/disable geo-fence screen 72 and an enable/disable geo-fence icon 73 displayed on a user computing device. FIG. 23 shows a location history screen 74 including current location for a vehicle shown on a map 75 displayed on a user computing device. FIG. 24 shows an event history screen 76 displayed on a user computing device.

FIG. 25 is a flow diagram 100 showing steps in a method of updating the location data of a vehicle according to the invention. Each tracker installed in a vehicle is configured to transmit its current location in intervals, such as one, two, three, four, five or more minute intervals, and at step 101, the tracking device queries a GPS Satellite in order to attain its current location coordinates. The tracking device of a vehicle requests an up-to-date location report from the GPS satellite, which returns location information to the tracking which is then stored in device memory.

At step 102, once received the tracker then transmits a message via USSD, using a custom USSD enabled SIM Card, to a USSD gateway which receives the message. Custom firmware on the tracking device thus sends the following data to the USSD Gateway via a USSD enabled SIM: device IMEI (unique identifier), longitude, latitude, timestamp, current speed (kmph), heading (direction), USSD routing ID, and at step 103, and then transmits location data by performing an HTTP post request containing the message data to the application programming interface, indicated in the flow diagram 100 as the "TracknStop API", of the remote control computer server. The step of the USSD gateway transmitting location data to the API comprises steps of the gateway receiving message and querying the custom USSD Routing ID, and constructing an XML packet of information with following elements: MSISDN (SIM Identifier), Subscriber ID (Unique SIM Subscriber), Customer ID (TracknStop ID), Routing ID (request-text), Message payload (full-request). The XML data packet is sent via an HTTP POST request to API endpoint located at the remote control computer server.

At step 104, the remote control computer server receives the incoming message, authenticates the message source and content. More specifically, the HTTP POST request is received by the API and IP Address of sending server is compared against white listed IP addresses. Once the request source has been validated the XML data is then broken down into the following elements: MSISDN and Message Payload. The Message Payload is then sanitised and validated before proceeding. The Message Payload is then broken down into the following elements: Message type (such as a location update or an alert, in this case the message is a location update), device IMEI, longitude, latitude, speed, heading and/or timestamp. The device IMEI is then matched to a Device ID within the application database. (If there is no device matching the IMEI the process is aborted and a failure message is added to the system logs and also returned to the USSD Gateway).

Once all processing has been successfully completed the data is then passed to the data layer for insertion into the database. At the database the passed data is compared with the most recent location information for this tracker device with the previous entry, and further processing steps are performed, such that: if longitude/latitude values are identical: then update the timestamp within the previous record rather than inserting a new record, or, if longitude/latitude values are different then fields including Device ID, Timestamp, Longitude, Latitude, MSISDN, Speed and Heading are then inserted into the database, or if there was an error inserting the data then the error is logged within the system logs, otherwise nothing is returned.

Once authenticated the message is then broken down into the required parts, associated with the tracking device that it was sent from, and at step 105, is stored in the application database.

FIG. 26 is a flow diagram 110 showing steps in a method of displaying location data of a vehicle according to the invention.

In order to display the selected vehicles most recent location, at step 111, the application must query the database to get the most recently added longitude and latitude coordinates that have been transmitted by the tracking device. Such a query comprises steps of, for a currently selected device id (eg: currently viewing device 78), triggering a java script function to call API function which gets the most recent location of the database, authenticating that the user/tracking device/device id making the request has permissions to do so, requesting most recent location data from the database, selecting the most recently added location data from location history table in the database for, and returning the most recently entered location data for the device id.

At step 112, once these coordinates have been retrieved the previous coordinates are then compared to the most recent ones to determine whether they are different by performing steps of: check the field [location_datetime_until] for a value other than null and if the value is null then it is determined that it is a different location, and if the value is not null it is determined that it is not a different location. Location data is then transmitted via a JSON encoded string At step 113, if the coordinates are determined as being different then the map, time updated, address, current speed and longitude/latitude coordinates are updated within the user interface to indicate the new values, together with the most recent date and time of the location update. An updated location within the map display area is also shown on a display.

At step 114, if the location is the same then the time updated indicator on the user interface is the only element that is updated on-screen.

FIG. 27 is a flow diagram 120 showing steps in a method of displaying location data of a vehicle on a specific date or range of dates according to the invention.

To display a vehicle's location history on a specific date, at step 121, the system requires a date to load all location entries for that date and device id. By default the date is the current date, the user can alternatively select a date in the past. Such a step involves obtaining the currently selected device id and current date (such as, currently viewing device 78 and current date is Apr. 14, 2014) and triggering a java script function to call API function which gets all location entries from the database for the current date and device id.

At step 122, once the date has been selected the system requests all of the location entries between 00:00:00 and 23:59:59 for that date which are associated with the device id. It should be noted that the user can only select from dates that there have location entries stored for the selected device. The user making the request is authenticated as having permissions to do so and all location data for current date and device id is requested from the database, whereby location data from a location history table in the database for the current date and device id is returned, preferably in sequential order descending from most recent, encoded in preferred format, such as JSON format, and returned to the presentation layer At step 123, all location entries are then returned to the presentation layer via a JSON encoded string and displayed on the screen in the following manner: Poly-lines are drawn on the map which connect each individual longitude/latitude coordinate returned for that date, and each location entry timestamp and speed is loaded into a sidebar widget which allows the user to click on each entry and pinpoint the location on the map. The location data is received by a java script function and passed to another function which renders the data within the user interface. Poly-lines are drawn on the map to display all of the location entries for that particular day. These are ordered sequentially so that the user can view the selected vehicle's movements throughout the day. Each location entry is also listed within a sidebar with the timestamp and speed. The user can select each entry and the map will create a pin at the location and also pan the map to that location.

FIG. 28 is a flow diagram 130 showing steps in a method of obtaining a real-time location update of a vehicle according to the invention.

When a user requires a real-time location update they can click the 'locate' button within the user interface. When clicked an AJAX call is made to the API which, at step 131, then transmits a location request to the USSD gateway. This request is received by the USSD gateway, which at step 132, then relays the command to the tracking device via USSD.

This message is received by the USSD SIM card installed in the device. The firmware on the device receives and processes the request from the SIM, recognising that it is a request to return its current location, and at step 133, the device then queries the GPS satellite, which then returns the device's current location coordinates as well as its speed, heading and the time that the location update was returned by the satellite.

At step 134, once data is received, the device then sends a USSD message to the USSD gateway, which at step 135, then constructs an XML packet and makes a HTTP POST request containing the location data and device information to the API. At step 136, the API first authenticates the data packet, then breaks it down into the required elements and passes the data to the database, and at step 137, once the data has been received in the data layer it is stored within the application database and is then passed back to the presentation layer where, as shown in step 138, it is displayed, such as according to the steps shown in FIG. 26.

FIG. 29 is a flow diagram 140 showing steps in a method of rebooting a control device according to the invention. At step 141, a user clicks the 'reboot device' button and this triggers a java script function and AJAX request to the API, which in turn makes a HTTP POST Request to the USSD Gateway containing a reboot command for the selected device. At step 142, the USSD gateway receives and then converts the message to USSD format and relays the command to the device. At step 143, when the device receives the reboot command, the firmware on the device recognises the request to reboot and does so accordingly. No response is required from the device for this process to complete.

FIG. 30 is a flow diagram 150 showing steps in a method of disabling and enabling a starter ignition for a vehicle according to the invention. At step 151, the disable or enable starter command is sent when the user clicks the disable or enable starter button or icon within the user interface. Once the button is clicked, a java script function makes an AJAX request to the API. At step 152, the API receives this information, verifies that the current user has permissions to send the command and then transmits the enable or disable starter command to the USSD Gateway. At step 153, the USSD Gateway converts the command to a USSD message and then transmits it to the control device, and at step 154, when the device receives the command the firmware of the control device recognises the command structure and sends a signal through an output on the device. Once the starter is disabled the keys to the vehicle will not work and it will not be possible to 'hot-wire' the vehicle, and at step 155, a confirmation messages is then returned to the USSD gateway and then to the API at step 156.

At step 157, once the confirmation has been processed and properly routed to the correct device, it is, according to step 158, stored in the application database. Once stored in the database, at step 159, the user interface displays the updated status.

FIG. 31 is a flow diagram 160 showing steps in a method of controlling supply of power to a fuel pump of a vehicle to activate and deactivate the fuel pump according to the invention.

At step 161, and in order for a user to control motion of a vehicle, the user can click the cut fuel pump button or icon within the application interface, which triggers the transmission of an AJAX request to the API, which then determines if the current user has permissions to cut the fuel pump on the selected vehicle. Once confirmed, the API then sends, at step 162, a HTTP POST Request to the USSD gateway which performs its own authentication and then relays, at step 163, the command to the control device via a USSD message sent across a GSM Network.

At step 164, when the control device coupled to the vehicle receives the command to cut the fuel pump, the device then outputs a square wave digital signal which turns on and off a relay switch which is attached to the power supply of the fuel pump mechanism within the vehicle. At step 165, by controlling power supply to the fuel pump it is 'turned on' and then 'turned off' a number of times, such as one, two, three, four, five or more times, in a row with intervals of one or more seconds within each increment, and eventually ending in the 'off position, to bring a moving vehicle to a gradual stop. Once this process is complete the vehicle will also no longer be able to be started due to there being no power being allowed to the fuel pump mechanism.

At step 166, once the command is received and the process has been completed, the device then sends a confirmation message back to the USSD Gateway, which in turn, at step 167, sends the message back to the API which, at step 168, updates the system database and user interface with data concerning the fuel cut event.

FIG. 32 is a flow diagram 170 showing steps in a method of disabling and enabling motion alerts according to the invention.

Motion alerts may be enabled or disabled so that when enabled, if the latest location update is different from the one previously, then an alert would be triggered. At step 171, the disable or enable motion alert process is triggered when a user clicks the disable or enable motion alerts button or icon within the user interface. Once the button is clicked, a java script function makes an AJAX request to the API. At step 172, the API receives this request, verifies the current user has permissions to send perform the request, and then, at step 173, transmits the command to update the location reporting frequency, such as to every five, ten, or more or less seconds as required, to the USSD Gateway. At step 174, the USSD Gateway converts the command to a USSD message and then transmits it to firmware of the vehicle control device, which when received, recognises the command structure and modifies an on-board configuration to send location reports every five, ten, or more or less seconds as required, instead of every one minute, which may be provided as the default. If the request is to disable motion alerts, then the update frequency is changed to one minute, or to however many minutes is required or desired. Once the report frequency has been updated, at step 175, a confirmation message is returned to the USSD gateway and then to the API. At step 176, once the confirmation has been processed and properly mapped to the correct device, at step 177, the updated status is stored in the application database. Once stored in the database, at step 178, the user interface displays the updated status.

FIG. 33 is a flow diagram 180 showing steps in a method of disabling and enabling privacy mode according to the invention.

Privacy mode is a method of preventing location updates being visible on any reports from the time it is enabled until the time it is disabled. At step 181, privacy mode is enabled/disabled when a user clicks the disable or enable privacy mode button or icon within the user interface. Once the button is clicked, a java script function makes an AJAX request to the API. At step 182, the API receives this request, verifies the current user has permissions to perform the request, and then updates the device privacy status within the application database. At step 183, once the status is updated, the user interface is updated to reflect the change.

FIG. 34 is a flow diagram 190 showing steps in a method of creating one or more geo-fences according to the invention. At step 191, a geo-fence is created by the user by selecting a number of points on a map to create a polygon, radius or rectangle around a particular geographic area of the map. At step 192, once the type of geo-fence is selected the user then plots the geo-fence on the map interface. After the geo-fence has been plotted the user then clicks the save button, which triggers an AJAX call to the API. The individual longitude and latitude values of each point selected by the user are ordered sequentially and passed to the API for processing. At step 193, the API verifies the user has permissions to create a geo-fence and then the geo-fence title, selected colour and individual points are passed to and saved in the database. At step 194, once the geo-fence is saved, the user interface is updated to display the new geo-fence as part of the selected devices stored geo-fences.

FIG. 35 is a flow diagram 200 showing steps in a method of activating and deactivating geo-fences according to the invention. At step 201, a geo-fence is activated or deactivated by selecting the geo-fence option within the user interface and then clicking the enable/disable button or icon within the user interface. Once this button is clicked an AJAX call is made to the API which confirms that the current user has permissions to update the geo-fence status for the selected device.

At step 202, once this has been confirmed the API then transmits an 'update location report frequency' command to the USSD gateway, which then transmits the command to the selected device via USSD. At step 203, the SIM on the tracking control device receives this command and passes it on to the firmware of the device, which recognises the command and updates the reporting frequency to every one, two, three, four, five, ten or more seconds as required, instead of every minute. At step 204, a confirmation message is sent back to the USSD gateway, and at step 205 the USSD gateway then transmits the confirmation message back to the API, which at step 206, processes the incoming request. At step 207, the API updates the geo-fence status in the database. Once the status has been updated in the database, at step 208, the user interface is updated to indicate that the geo-fence has been enabled or disabled.

FIG. 36 is a flow diagram 210 showing steps in a method of triggering motion alerts according to the invention. When motion alerts are enabled for a particular control device the system will compare the previous longitude/latitude coordinates of the device to the current ones in order to determine, at step 211, whether the device has moved since the last update. If the location has changed, then the system will retrieve the users primary mobile phone number and email address and, at step 212, send an alert notification via email and/or by SMS to a user device, such as a mobile or smart phone or PC. At step 213, the event history if updated by storing the alert information in the application database and if the user is currently using the application, at step 214, an alert will be displayed within the user interface, otherwise it will be displayed the next time that the user logs in to the app.

FIG. 37 is a flow diagram 220 showing steps in a method of triggering GSM jamming alerts according to the invention. A GSM jamming alert is triggered by the device when it is unable to connect to a GSM network. At step 221, when a GSM signal jamming is detected by the device it sends, at step 222, an alert to the USSD gateway which in-turn, at step 223, relays the alert to the API. At step 224, once the API receives this alert, the data is authenticated and then associated with the specific control device that the alert was sent from. At step 225, the system will retrieve a user's mobile phone number and email address and send the alert notification via email and by SMS. At step 226, the event history is updated by storing the alert information in the application database and if the user is currently using the application, at step 227, an alert will be displayed within the user interface, otherwise it will be displayed the next time that the user logs in to the app.

FIG. 38 is a flow diagram 230 showing steps in a method of triggering a geo-fence breach alert according to the invention. When a geo-fence is enabled the system compares each incoming location report to see if it is outside of the currently active geo-fence. At step 231, if the determined location of the device is outside of the active geo-fence, then the system will retrieve the primary email address of the user associated with the device and will, at step 232, send an email and SMS alert to the user. At step 233, the alert information will also be stored within the application database. At step 234, if the user is currently using the application an alert will be displayed within the user interface. Alternatively, the alert will be displayed the next time the user accesses the application.

Other aspects of the present invention relate to:

A method of controlling a powered vehicle substantially as herein described with reference to and as shown in the accompanying drawings.

A control device for a powered vehicle substantially as herein described with reference to and as shown in the accompanying drawings.

A control system for at least one powered vehicle substantially as herein described with reference to and as shown in the accompanying drawings.

Aspects of the present invention have been described by way of example only and it should be appreciate that additions and/or modifications may be made thereto without departing from the scope thereof as defined in the appended claims.

The invention claimed is:

1. A control device for a powered vehicle comprising:
   a communications unit operable to receive vehicle control signals from a remote computer, and
   a control unit coupled to the communications unit, to a fuel pump of the vehicle and to an ignition system of the vehicle, the control unit comprising:
   fuel pump switching means operable to activate and deactivate the fuel pump of the vehicle such that movement of the vehicle is controlled by a plurality of digital commands to incrementally slow the vehicle in a stepwise manner in response to a vehicle control signal received by the communications unit, and
   an ignition system switching means operable to control the supply of power to the ignition system to activate and deactivate the ignition system such that the vehicle is immobilised and mobilised in response to a vehicle control signal from the remote computer, and
   vehicle position tracking means operable to capture real time location data for the vehicle and to transmit the location data to the remote computer to display a current location of the vehicle.

2. The control device as claimed in claim 1, in which vehicle control signals are transmitted as unstructured supplementary service data (USSD) signals.

3. The control device as claimed in claim 1, in which the communications unit is operable to receive and to transmit to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

4. The control device as claimed in claim 1, in which the data is transmitted as one or more of: an unstructured supplementary service data (USSD) signal, a GPRS signal and a text message.

5. The control device as claimed in claim 1, in which the remote computer is one or more of a: remote control computer server, or a mobile computing device, such as a smart phone, laptop or personal computer.

6. The control device as claimed in claim 1, further comprising motion sensing means operable to sense movement of the vehicle and to transmit motion data to the remote computer.

7. The control device as claimed in claim 6, in which the motion sensing means is adapted to detect an impacting force on the vehicle, in which detection of an impacting force triggers the transmission of an impact detection signal from the communications unit to the remote computer and automatically generates a channel for audio communication from audio input/output means of the vehicle to the remote computer.

8. A method of controlling a powered vehicle using a control device comprising one or more processors and a memory, the method comprising steps of:

receiving a vehicle control signal from a remote computer at a communications unit of the control device, and activating and deactivating a fuel pump by a plurality of digital commands to control the supply of fuel to the fuel pump of the vehicle such that movement of the vehicle is controlled in a stepwise manner in response to the vehicle control signal received by the communications unit, controlling the supply of power to an ignition system of the vehicle to activate and deactivate the ignition system such that the vehicle is immobilised and mobilised in response to the vehicle control signal from the remote computer, and operating vehicle position tracking means to capture real time location data for the vehicle and to transmit the location data to the remote computer to display a current location of the vehicle.

9. The method of controlling a powered vehicle as claimed in claim 8, comprising a step of: transmitting the vehicle control signals from the remote computer as unstructured supplementary service data (USSD) signals.

10. The method of controlling a powered vehicle as claimed in claim 8, comprising a step of: receiving and transmitting to the remote computer data including one or more of: images captured by an on-board vehicle camera; motion alerts; geo-fence alerts; GSM jamming detection alerts; control device reboot alerts; ignition system activation and deactivation alerts, and/or fuel pump activation and deactivation alerts; driver behaviour alerts; panic button alerts, and sounds captured by an on-board vehicle microphone.

11. The method of controlling a powered vehicle as claimed in claim 8, comprising a step of: transmitting the data as one or more of: an unstructured supplementary service data (USSD) signal, a GPRS signal and a text message.

12. The method of controlling a powered vehicle as claimed in claim 8, comprising a step of: sensing movement of the vehicle and transmitting motion data to the remote computer.

13. The method of controlling a powered vehicle as claimed in claim 8, comprising a step of: detecting an impacting force on the vehicle, in which detection of an impacting force triggers transmission of an impact detection signal from the communications unit to the remote computer and automatically generates a channel for audio communication from audio input/output means of the vehicle to the remote computer.

14. The control device as claimed in claim 1, in which the plurality of digital commands to incrementally slow the vehicle in the stepwise manner are square wave digital output signals.

15. The method of controlling a powered vehicle as claimed in claim 8, in which the plurality of digital commands to incrementally slow the vehicle in the stepwise manner are square wave digital output signals.

\* \* \* \* \*